United States Patent [19]

Grundland

[11] Patent Number: 4,584,661

[45] Date of Patent: Apr. 22, 1986

[54] MULTI-BIT ARITHMETIC LOGIC UNITS HAVING FAST PARALLEL CARRY SYSTEMS

[76] Inventor: Nathan Grundland, 6, Alkalai Street, Rehovoth, Israel

[21] Appl. No.: 659,512

[22] Filed: Oct. 11, 1984

Related U.S. Application Data

[63] Continuation of Ser. No. 503,062, Jun. 10, 1983, abandoned, which is a continuation of Ser. No. 256,405, Apr. 22, 1981, abandoned.

[30] Foreign Application Priority Data

Apr. 23, 1980 [IL] Israel ................................. 59907

[51] Int. Cl.$^4$ .............................................. G06F 7/50
[52] U.S. Cl. .................................................... 364/787
[58] Field of Search ................................ 364/736, 787

[56] References Cited

U.S. PATENT DOCUMENTS

| | | | |
|---|---|---|---|
| 3,805,045 | 4/1974 | Larsen ................................. | 364/787 |
| 3,900,723 | 8/1975 | Bethany et al. ................... | 364/736 X |
| 3,993,891 | 11/1976 | Beck et al. ......................... | 364/787 |
| 4,118,786 | 10/1978 | Levine et al. ..................... | 364/787 X |
| 4,319,335 | 3/1982 | Rubinfield .......................... | 364/787 |
| 4,323,981 | 4/1982 | Nakamura ......................... | 364/787 X |

Primary Examiner—Gary V. Harkcom
Attorney, Agent, or Firm—Benjamin J. Barish

[57] ABSTRACT

A multi-bit arithmetic logic unit having a fast carry-look-ahead (CLA) system comprises logical preparation (LLP) circuitry of the first CLA level which interconnects several bit positions so as to output intermediate combination signals which are a function of a plurality of bit positions, rather than of a single bit position. In addition, the carry-in signal ($C_{IN}$) into the least-significant-bit (LSB) of the respective group is separated from the intermediate combined propagated carry signal ($C_p$) between groups, and is introduced into the input of the LLP circuitry of the first CLA level, combined with the LSB signals, and also with a binary "split" signal whose state determines whether the $C_{IN}$ is to be inputted or not. In addition, the ALU may be comprised of a plurality of identical integrated circuit chips called Y-chips, each including LLP and logical combination (LLC) circuitries of two CLA levels having reverse input-output logic such that a plurality of such chips may be connected together to form a two-level CLA, and may also be connected together, with the addition of further chips, called Z-chips, having a one-level CLA, to produce three-level, or higher-level, CLA systems.

13 Claims, 24 Drawing Figures

FIG. I (PRIOR ART)
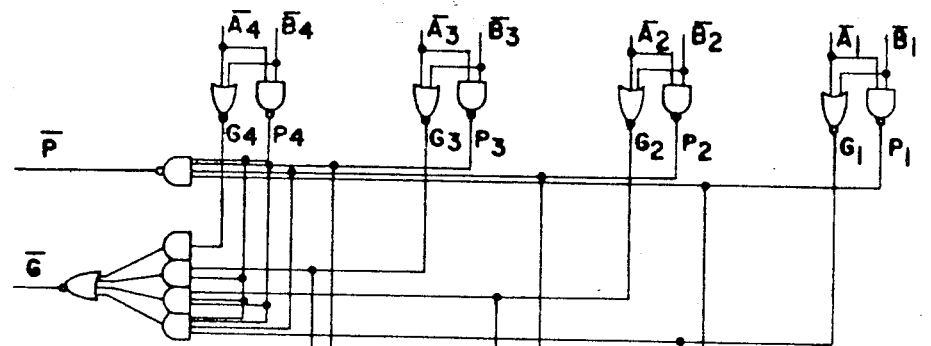
FIG. 1a (PRIOR ART)
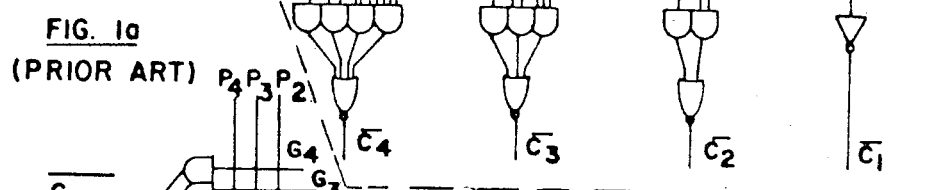
FIG. 1b (PRIOR ART)
FIG. 1c (PRIOR ART)
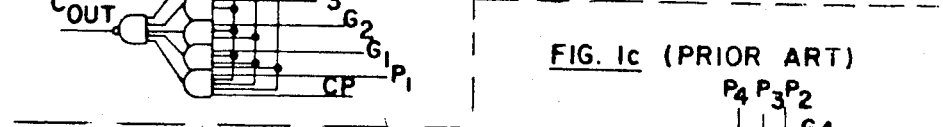
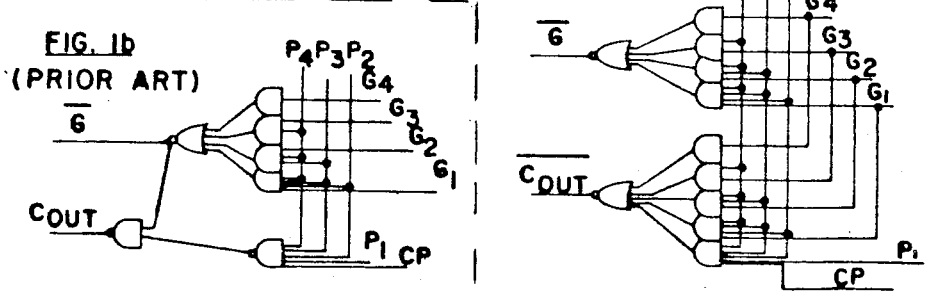
FIG. 2 (PRIOR ART)
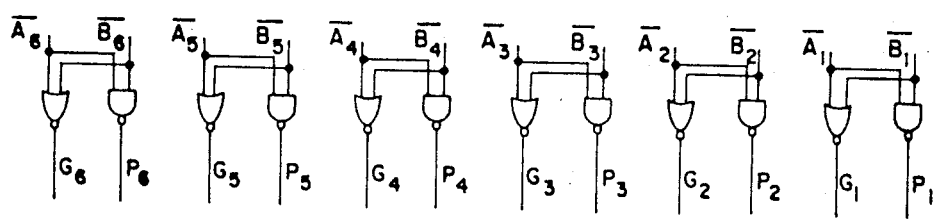

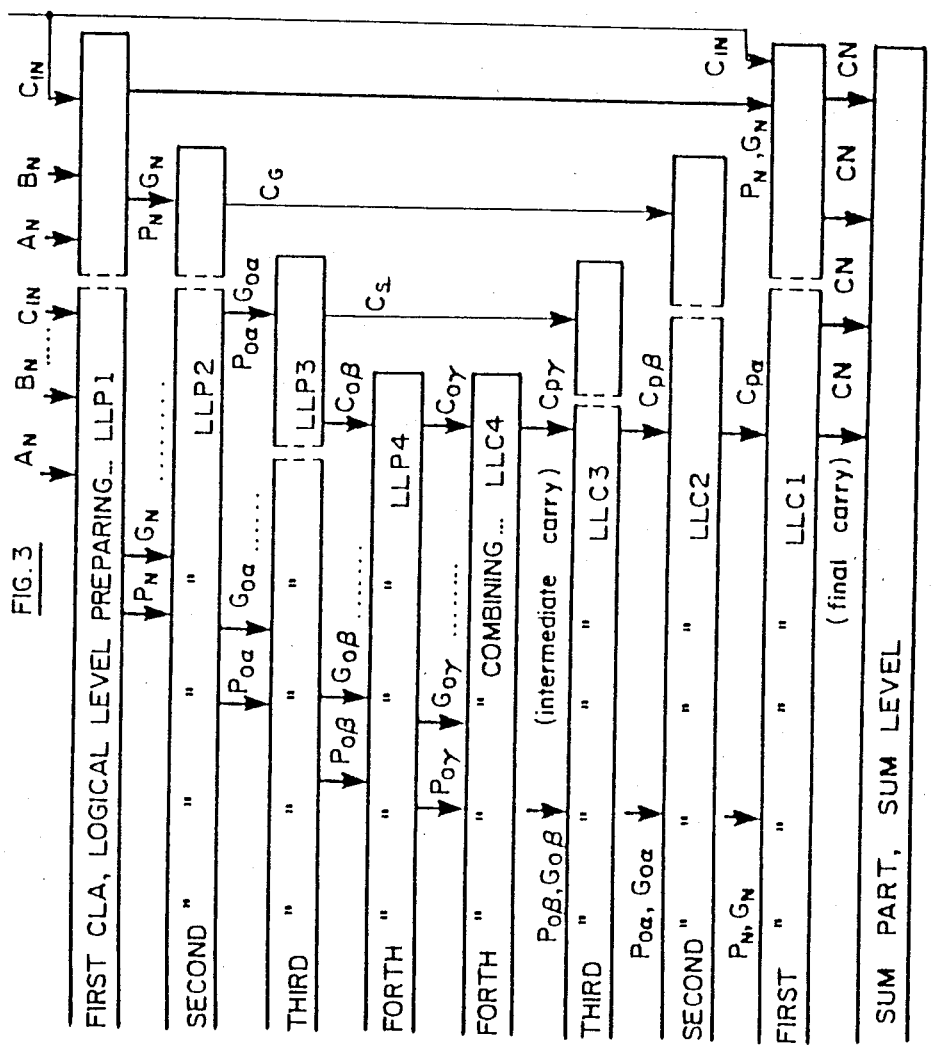

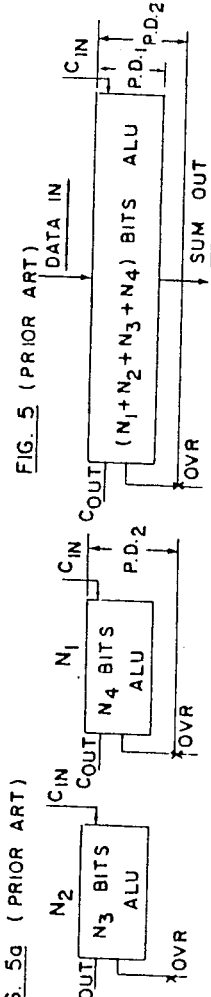
FIG. 5 (PRIOR ART)
FIG. 5a (PRIOR ART)
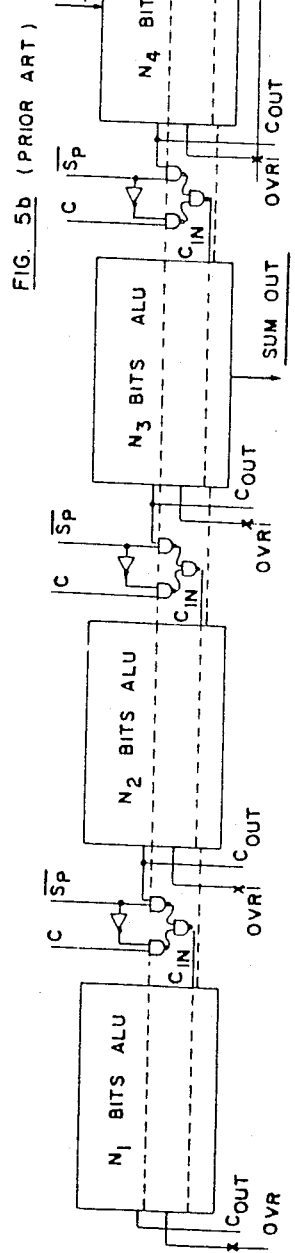
FIG. 5b (PRIOR ART)
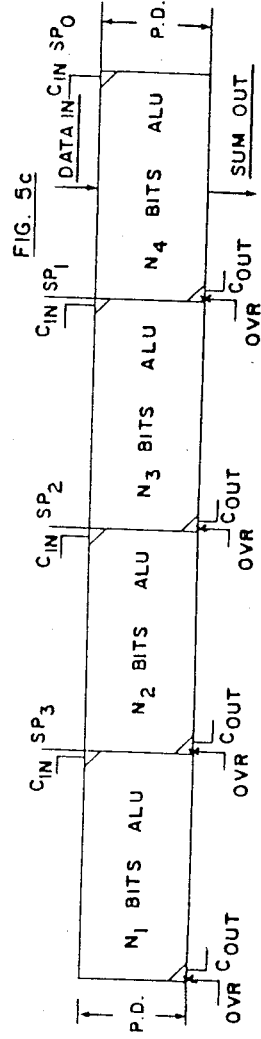
FIG. 5c

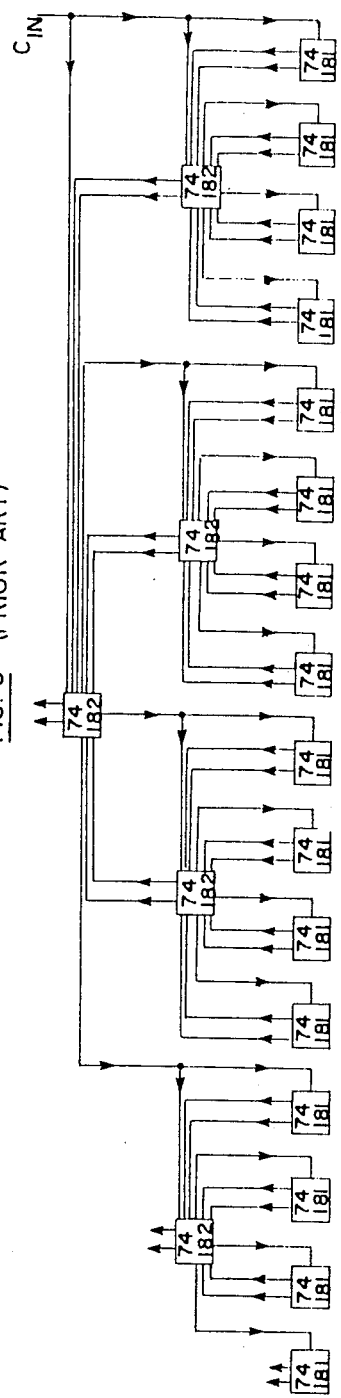
FIG. 6 (PRIOR ART)
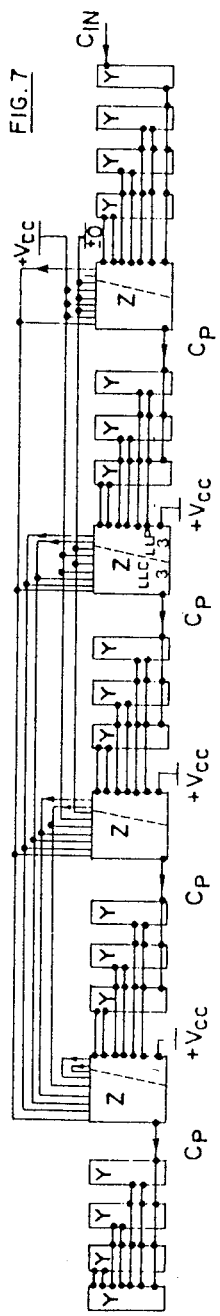
FIG. 7
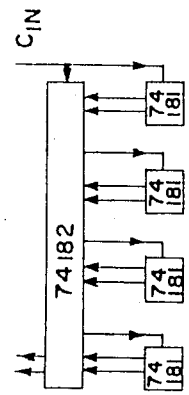
FIG. 6A 2 LEVEL CLA (PRIOR ART)
FIG. 7A 2 LEVEL CLA

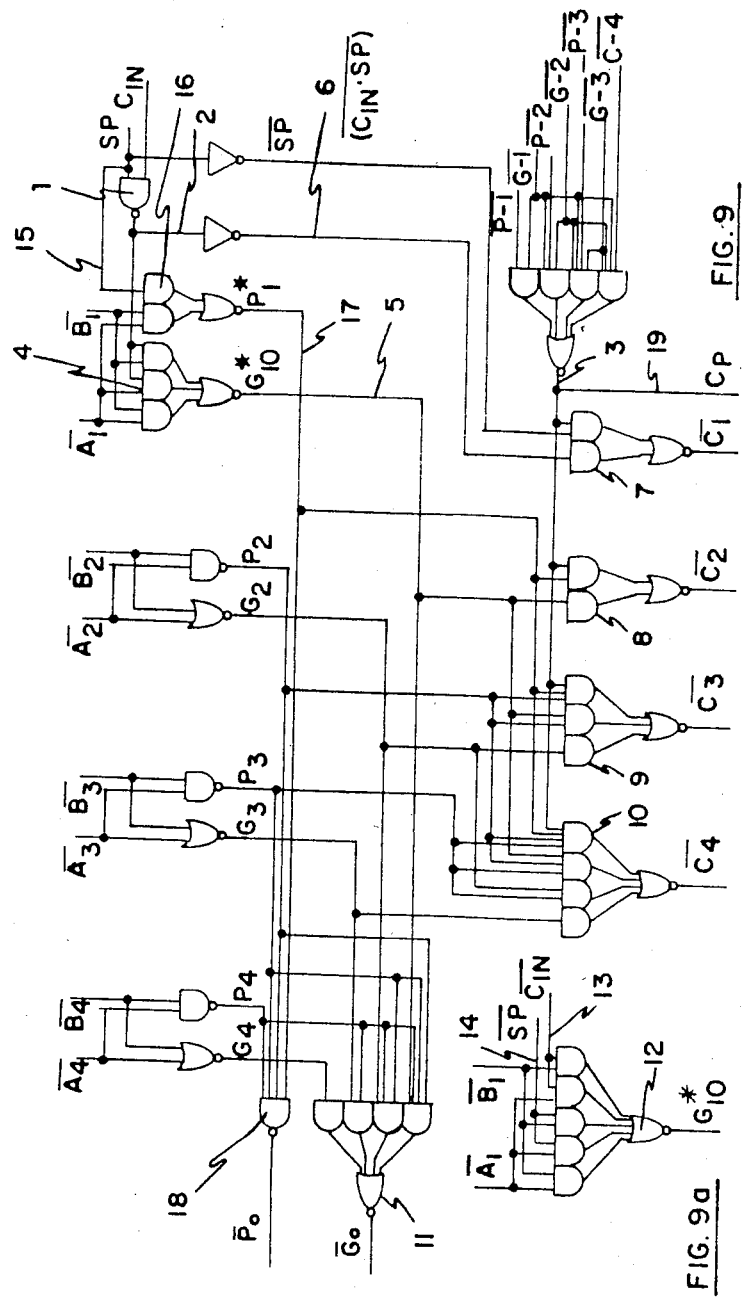

| Fig.10a |
|---------|
| Fig.10b |

8 BIT GROUP

MULTI-BIT ARITHMETIC LOGIC UNITS HAVING FAST PARALLEL CARRY SYSTEMS

This application is a continuation of Ser. No. 503,062, filed June 10, 1983, now abandoned, which is in turn a continuation of application Ser. No. 256,405, filed Apr. 22, 1981, now abandoned.

BACKGROUND OF THE INVENTION

The present invention relates to multibit arithmetic logic units (ALU's), more specifically, multibit adders-subtractors (A/S), having fast carry-look-ahead (CLA) systems, and particularly to a CLA system designed to speed-up the execution of arithmetical operations.

As known, most of the time required by ALU's to execute arithmetical operations is due to the carry propagation delay via the CLA system. Many systems involving various CLA techniques have been devised to reduce this delay. These known techniques, however, require the introduction of additional circuitries whose complexity increases inordinately after a certain number of bits. These additional bits contribute additional propagation delay (PD) per each additional CLA level, which is a primary limitation in speeding-up the operation of extended-length ALU's.

OBJECTS OF THE INVENTION

A general object of the present invention is to provide an ALU incorporating an improved CLA system which permits a significant increase in the number of bits within existing CLA levels while reducing the worst case propagation delay (PD) path through the ALU, thereby permitting a significant increase to be made in speeding up arithmetic operations of an extended-length ALU with a minimum penalty of additional circuitry to be included.

More particularly, one object of the invention is to provide a system of combining logical circuits that enables the assembling of an extended-length ALU while reducing extreme output loads and improving execution time, as compared to known ALU circuits, such as the 74181, AM 2901, or the circuit described in Note 1 at the end of this specification. Another object of the invention is to provide a new system for implementing the concept of splitting a large-scale, hard-wired ALU into multiple, small-scale ALU groups or sections, e.g., by programming with software of firmware, by option block wiring or fixed wiring, or by other known techniques.

A further object of the invention is to provide an ALU which permits the simultaneous processing and execution of arithmetic functions of different data and operand lengths.

A still further object of the invention is to provide an ALU having means for selecting desired accuracy of calculated functions, such as multiplication, division, while maintaining maximum efficiency of the ALU.

Additional objects will be apparent from the description below.

BRIEF SUMMARY OF THE INVENTION

The present invention is directed to ALU's including a carry-look-ahead (CLA) system having a plurality of CLA levels, each level including; (1) logical preparation (LLP) circuitry in which are produced intermediate combined signals, the generated carries ($G_N$) and the propagated carries ($P_N$) of the respective bit position ($A_N$, $B_N$) and $G_0$, $P_0$, for the respective group or section position; and (2) logical combination (LLC) circuitry in which are produced the propagated combined carry signals, i.e. the final combined propagated carry ($C_N$), for the first CLA level, or the intermediate combined propagated carry signals ($C_P$) for other than the first CLA level.

According to one feature of the invention, the LLP circuitry of the first CLA level interconnects several bit positions so as to output from the first-level LLP circuitry intermediate combination signals which are a function of a plurality of bit positions ($P_N$, $G_N$), rather than of a single bit position. Such an arrangement, as will be described more particularly below, enables a significant increase to be made in the number of bits per group, the number of groups per section, etc., while relatively reducing both extreme logic circuitry and total propagation delay of the complete ALU.

According to another feature of the present invention, the carry-in signal ($C_{IN}$) into the least-significant-bit (LSB) of the respective group is separated from the intermediate combined propagated carry signal ($C_P$) between groups, and is introduced into the input at the first-level LLP circuitry combined with the LSB signals, preferably also with a binary "split" signal (SP) whose state determines whether the adder is splitted and the $C_{IN}$ is to be inputted or not; whereas the $C_P$ signal is introduced into the LLC circuitry input of the respective CLA level, and the split signal determines whether the $C_p$ is disabled or not.

Including the $S_P$ ("split") signal provides a number of advantages within the CLA system, as will be described more fully below; however, it further enables executing various concepts of up-coming new ideas in multi-processing and flexible use of the ALU, including varying the number of data groups to be executed, varying the desired accuracy of execution, executing multiple data simultaneously, and executing multiplication, division and other repetitive algorithms. In addition, the manner in which the SP signal is used does not introduce additional propagation delay, and it saves at least one unit of time delay.

According to a still further feature of the invention, a CLA integrated circuit (IC) device incorporates both the LLP and the LLC of the respective CLA level, as distinguished from existing IC's, such as the 74182, wherein the circuitries for the LLP and LLC logical levels for the same CLA level are divided between different IC;s.

This latter feature permits the ALU to be better divided into IC chips based on either negative or positive CLA logic. Besides decreasing the output loading, the new IC chip design is applicable for: (1) negative inputs to positive outputs for the LLP logical level, and positive inputs to negative outputs for the LLC logical levels; or (2) positive inputs to negative outputs for the LLP logical levels, and negative inputs to positive outputs for the LLC logical levels.

Such an arrangement permits the IC chips to be used for alternate CLA logical levels which, by using wide gates, provides improved results and a minimum of propagation delay. Thus, this technique reduces the propagation delay as compared to existing ALU arrays using devices such as the 74182, in that one inverter delay is saved for the second CLA level, and two inverter delays are saved for each succeeding CLA level.

According to a still further feature of the invention, the circuitry incorporating the functions selector arithmetic-logic ("ADD", "AND", "OR", "XOR") are included within the Sum Part level, thus enabling further reduction to be made of propagation delay while switching from arithmetical functions to logical functions.

Further features and advantages of the invention will be apparent from the description below.

BRIEF DESCRIPTION OF THE DRAWINGS

The invention is herein described, by way of example only, with reference to the accompanying drawings, wherein:

FIG. 1 illustrates a known single-level, four-bit CLA system, and FIGS. 1a–1c illustrate known modifications to such a system, all of which will be helpful in explaining the present invention;

FIG. 2 illustrates the LLP logical level only of the known CLA system of FIG. 1, except that FIG. 2 illustrates a six-bit CLA system, rather than the four-bit system of FIG. 1;

FIG. 3 is a diagram illustrating the circuit connections in the known plural-level CLA system which diagram will aid in better understanding the propagation delays involved in the operation of such a system;

FIGS. 5, 5a, 5b, 5c are further diagrams which will be helpful in better understanding certain advantages involved in the present invention, particularly when breaking an ALU into groups, FIGS. 5, 5a and 5b illustrating the prior art, and FIG. 5c illustrating certain advantages when the present invention is used;

FIGS. 6 and 6a diagrammatically illustrates the architecture of a known ALU including three and two levels, respectively, of the CLA;

FIG. 7 illustrates the architecture of an ALU corresponding to that of FIG. 6 but incorporating certain features of the present invention, while FIG. 7a illustrates the novel ALU architecture when only two CLA levels are provided;

FIG. 9 is a diagram illustrating a 4-bit CLA system corresponding to the known circuit of FIG. 1 but incorporating certain features of the present invention; FIGS. 9a and 9b being modifications in the circuit of FIG. 9;

FIGS. 12 and 13 illustrate how standard printed circuit cards may be designed to assemble, into different combinations, components constructed in accordance with the invention.

SOME NOVEL CONCEPTS OVER THE PRIOR ART

Figure 4A:
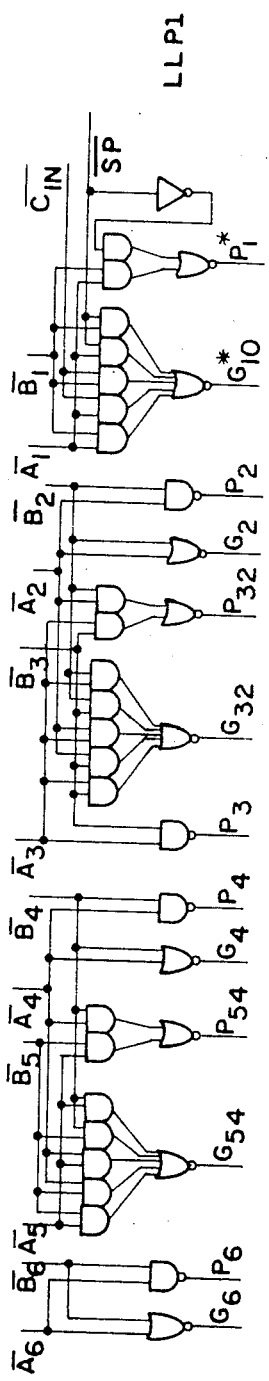
FIGS. 4a and 4b are diagrams, corresponding to that of FIG. 2, but illustrating certain concepts involved in the present invention.

Before describing the specific implementations of the invention as illustrated in FIGS. 10–13, it is believed desirable, as an aid in understanding them, to first describe some novel concepts incorporated in these specific implementations.

As known, the arithmetic portion of an ALU is divided into two parts, namely the Sum Part and the Carry-Look-Ahead (CLA)Part. The CLA part includes several CLA levels in order to reduce propagation delay, which thereby speeds up the execution of arithmetic functions. The total number of bits per ALU ($N_F$) executing 2's complement operations is equal to the total number (N) of bits per group, group per sections, sections per division, etc. raised to the power of the number of participating CLA levels (L); thus: $N_F = N^L$.

Normally, an ALU executes at least one arithmetic operation, namely addition (substraction being executed by 2's complement addition), which dictates the propagation delay, and therefore the maximum clock rate. ALso, an ALU executes at least the logic functions "AND", "OR", "XOR", etc.

Although the CLA equations are known to those familiar with this subject, let us set forth some basic definitions.

Thus, $A_N$, $\overline{A_N}$, $B_N$ and $\overline{B_N}$ designate the input into the Adder/Subtractor at the N'th position of two multi-bit numbers. "A" and "B" added together form the output result "F", the least significant bit (LSB) position is designated as 1; $C_N$ designates the carry input into the N'th position.

The generated carry is defined as $G_N = A_N \cdot B_N = \overline{\overline{A_N} + \overline{B_N}}$.

The propagated carry is defined as $P_N = A_N + B_N = \overline{\overline{A_N} \cdot \overline{B_N}}$ The initial carry input signal into a least-significant bit of an adder is defined as $C_{IN}$, which has no propagating delay.

The inter-group carry signal is defined as $C_P$ which is propagated and therefore has a propagation delay.

As also known, the bits of the ALU are divided into groups, sections, divisions, etc., with the first level (CLA) being applicable to the bits within a group, the second level CLA being applicable to the groups within a section, the third level CLA being applicable to the sections within a division, etc.

Each of the foregoing CLA levels may be considered as further divided into two logical levels, each having a one-unit time delay. This, each CLA level includes: (1) a logical preparation level (LLP) in which are prepared the intermediate combined signals (P, G), the generated carry ($G_N$) and the propagated carry signals ($P_N$) for the respective bit positions ($A_N$, $B_N$), and $G_0$, $P_0$ for the respective group, section, etc. portions; and (2) a logical combination level (LLC) in which are combined the final combined propagated carry signals ($C_N$) for the first CLA level, or the intermediate combined propagated carry signal ($C_P$) for the other CLA levels.

The foregoing is illustrated in FIG. 1 showing a single-level, four-bit CLA system, wherein it will be seen that the upper logical circuitry receiving the input data bits ($A_1$, $B_1$, ... $A_4$, $B_4$, negative input logic being used) constitutes the $LLP_1$ logical level preparing the intermediate combined signals $G_1$, $P_1$ ... $G_4$, $P_4$ for generating the generated carry and the propagated carry; whereas the lower logical circuitry constitutes the $LLC_1$ logical level receiving the foregoing intermediate combined signals and combines them to prepare the final combined propagated carry signal $C_1$ ... $C_4$ for the respective group.

It will be noted that the prior art arrangement illustrated in FIG. 1, produces a propagated carry output signal (P), and a generated carry output signal (G), but not a carry-output signal ($C_{OUT}$); this is the case, e.g. in the TI 745381. Sometimes A $C_{OUT}$ signal is desired, for example in temporary carry storage, (e.g. Fairchild 9340); in that case, the modification illustrated in FIG. 1a, requiring additional circuitry, could be used, whereupon there would be produced $C_{OUT}$, but not G. If G together with $C_{OUT}$ is desired, the modification illustrated in FIG. 1b could be used, this involving further additional circuitry with additional delay in $C_{OUT}$ (e.g. TI 74181 or Fairchild 9341); and if it is desired to product P, G and $C_{OUT}$ without additional delay, the modification illustrated in FIG. 1c could be used, this requiring still further additional circuitry.

The logical preparing level $LLP_1$ of the system illustrated in FIG. 1 is also shown in FIG. 2, except that FIG. 2 shows a six-bit group rather than the four-bit group of FIG. 1. A six-bit group as appearing in the illustration of FIG. 2 would be impractical in a prior art system such as illustrated in FIG. 1, but nevertheless it is shown in FIG. 2 in order to provide a better basis for comparison with respect to the present invention as embodied in the diagrams of FIGS. 4a and 4b, and as will be described more particularly below.

The prior art circuit of FIG. 1 illustrates only the first level CLA including the LLP of the second level. As indicated above, ALU's conventionally include multiple-level CLA systems respectively applicable to the bits, groups, sections, etc. of the ALU, with each CLA level being further constituted of two logical levels, namely the LLP and the LLC logical levels.

FIG. 3 diagrammatically illustrates such a known multiple-level ALU. Thus, in an ALU having one CLA level, the preparation logical level (LLP) outputs are wired to the combination logical level (LLC) inputs, whereas the outputs of the LLC are wired to the Sum Part of the ALU. Since each of the two logical levels LLP and LLC involves one unit time delay, it will be seen that such a single-level ALU involves two units of time delay for the CLA.

As also shown in FIG. 3, in ALU's having two CLA levels, the $LLP_1$ outputs are wired to the $LLC_1$ inputs and also to the $LLP_2$ inputs; the $LLP_2$ outputs are wired to the $LLC_2$ inputs; the $LLC_2$ outputs are wired to the $LLC_1$ inputs; and the $LLC_1$ outputs are wired to the Sum Part. Thus, in a two-level CLA system, there would be four units of time delay for the CLA.

In general, the LLP outputs of the N'th CLA level are wired to the LLC inputs of the n'th CLA level and also to the the (N+1)'th CLA level; and the LLC outputs of the (N+1)'th CLA level are wired to the LLC inputs of the n'th CLA level.

The "P" and "G" signals are output signals of the first CLA level; they are basic intermediate combination signals of $A_N$, $B_N$ input signals. Thus, $P_N = f(A_N, B_N)$; and $G_N = f(A_N, B_N)$, wherein "N" is the bit position in the adder. $P_0$ and $G_0$ are output signals of other than the first CLA level, (i.e., groups within a section, sections within a division, etc.), higher intermediate combination signals of $P_N$, $G_N$ input signals. Thus, $P_0 = f(P_N)_{K \geq N \geq 1}$; $G_0 = f[(P_N)_{K \geq N \geq 2}(G_N)_{K \geq N \geq 1}]$ wherein "K" is the number of bits per groups (it may also be used for higher order CLA's, as the number of groups per section, etc.); "0" indicates output signals; and "N" indicates input signals also for higher CLA levels.

Figure 4B:
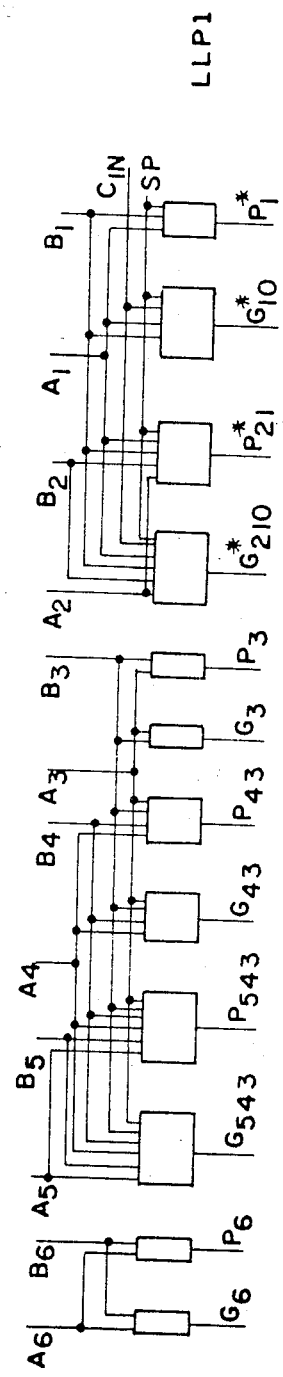

FIGS. 4a and 4b illustrate one of the novel innovations of the present invention, wherein the logical preparation level (LLP) of the first CLA level (i.e., bits within a group) includes circuitry interconnecting several bit positions so as to output from the $LLP_1$ logical level higher intermediate combination signals which are a function of a plurality of bit positions, rather than of a single bit position as in the prior art showings of FIGS. 1 and 2. Thus, some of the $P_N$ and $G_N$ output signals at the $LLP_1$ logical level are no longer a function of a single bit position, but rather are functions of several bit positions, as follows: $P_{(N)} = f(A_N, B_N)_{K \geq N \geq 1}$; $G_{(N)} = f(A_N, B_N)_{K \geq N \geq 0^*}$ wherein "(N)" is a function of several bit positions; and "0*" indicates that additional inputs are included in producing $G_{(N)}$.

Thus, as shown in the six-bit system of FIG. 4a, which is to be compared with the prior art six-bit system of FIG. 2, it will be seen that the $LLP_1$ logical level outputs the following intermediate combined signals: $G_6$, $P_6$, $G_{54}$, $P_{54}$, $G_5$, $P_4$, $G_{32}$, $P_{32}$, $P_3$, $G_2$, $P_2$, $G^*_{10}$ and $P^*_1$. Of these, it will be seen that $P_{54}$ and $G_{54}$ are higher combination functions of $A_5$, $B_5$, $A_4$, $B_4$; $P_{32}$, $G_{32}$ are higher combination functions of $A_3$, $B_3$, $A_2$, $B_2$; $G^*_{10}$ is a function of $A_1$, $B_1$, $C_{IN}$, $S_P$ (the latter being a "split signal" to be described more particularly below, without $S_P$, the signal is $G_{10}$, which is a function of $A_1$, $B_1$, $C_{IN}$); and $P^*_1$ is a function of $A_1$, $B_1$, $S_P$ (without $S_P$ the signal is $P_1$).

As will also be described more particularly below, providing the higher intermediate combination signals $P_{54}$, $G_{54}$, $P_{32}$, $G_{32}$ produces a number of important advantages: Thus, it increases the number of bits per group, while reducing extreme output loads and extreme inputs into the "AND" gates and "OR" gates within the same time-unit delay. In addition, providing the $G_{10}$ output signal permits more groups per section, more sections per division, etc., to be connected without producing extreme output loads, or extreme inputs into "AND" or "OR" gates. Also, the additional propagation delay of the overflow (OVR) signal is eliminated, thereby permitting shorter clock cycles and faster ALU operation.

FIG. 4b illustrates a six-bit system wherein the $LLP_1$ logical level outputs even higher intermediate combination signals, these being a function of three-bit positions, rather than a single bit position as in the prior art of FIG. 2, or two-bit positions as in the arrangement illustrated in FIG. 4A. Tables 1, 2 and 3, at the end of this specification, show the output signals in the three arrangements of FIGS. 2, 4a and 4b, respectively:

It will be noted that in the circuits of FIGS. 4a and 4b constructed in accordance with the present invention, the inputs into the LLP, of the group includes not only the $A_N$ and $B_N$ signals but also the two additional signals identified as $C_{IN}$ and SP, which signals were absent from the inputs in the corresponding prior art circuits of FIGS. 1 and 2. Instead of introducing these two signals into the logical preparation level $LLP_1$ of the respective CLA level, the prior art systems, as shown by the circuit of FIG. 1, introduces the signals $C_{IN}$ and $S_P$, via the input signal $C_P$, into the logical combination level $LLC_1$ of the respective CLA level as in FIG. 5b.

Another feature of the present invention resides in separating the carry-in signal $C_{IN}$ into the LSB of the respective group, from the combined propagated carry signals $C_P$ between the groups, and introducing the $C_{IN}$ signal into the $LLP_1$ logical level to be combined with the LSB's, and with the $S_P$ signal, as mentioned earlier, the $S_P$ signal is a binary "split" signal whose state determines whether or not the $C_{IN}$ signal will be operative. In this connection, it is to be pointed out that $C_{IN}$ is not an input for propagated carries, since $C_{IN}$ is combined at the $LLP_1$ logical level, and therefore $C_{IN}$ will be used for not-propagated carries, e.g., initial carry $C_{INIT}$, temporary carry storage, and other uses. Thus, as distinguished from the known circuitry (FIG. 1 and also in the 74S381), wherein the $C_{IN}$ signal is combined at the LLC logical level of the CLA system and is used also for combined least-significant-group carries, one of the features of the present invention is that the $C_{IN}$ signal is separated from the $C_P$ signal and is introduced into the $LLP_1$ logical level of the CLA group for carries which are not propagated, whereas the $C_P$ signal is inputted into the LLC logical level of the respective group for propagated carries.

The following discussion explains the advantages in this feature of the invention:

Thus, by distinguishing between and separating these two carry input signals $C_{IN}$ and $C_P$, and by adding the additional signal SP ("split-signal"), the carry-input signal becomes $(C_{IN} \cdot SP + \overline{SP} \cdot C_P)$, and the carry equations become:

$$C_1 = (C_{IN} \cdot SP + \overline{SP} \cdot C_P),$$

$$C_2 = G_1 + P_1 \cdot (C_{IN} \cdot SP + \overline{SP} \cdot C_P),$$

$$C_3 = G_2 + P_2 \cdot G_1 + P_2 \cdot P_1 (C_{IN} \cdot SP + \overline{SP} \cdot C_P) \text{ etc.}$$

Let us route the $(C_{IN} \cdot SP)$ signal, to be assimilated in the CLA system, in a difference path. This is done by specifically combining $(G_1 + P_1 \cdot C_{IN} \cdot SP)$ to produce $G^*_{10}$; then $G^*_{10} = (G_1 + P_1 \cdot C_{IN} \cdot SP)$. This may be done since $C_{IN}$ is not propagated and is therefore not delaying the completion of an arithmetical operation.

Let us also specifically combine $P_1 \cdot \overline{SP}$ to produce $P^*_1$; then $P^*_1 = P_1 \cdot \overline{SP}$, and the specific carry equations become:

$$C_1 = (C_{IN} \cdot SP + \overline{SP} \cdot C_P)$$

$$C_2 = G^*_{10} + P^*_1 \cdot C_P$$

$$C_3 = G_2 + P_2 \cdot G^*_{10} + P_2 \cdot P^*_1 \cdot C_P \text{ etc.}$$

These specific CLA equations have the built-in feature of splitting an adder. Thus:

If (SP) = "0", i.e., not split, then $G^*_{10} = G_{10}$ and $P^*_1 = P_1$; therefore:

$$C_1 = C_P$$

$$C_2 = G_1 + P_1 \cdot C_P$$

$$C_3 = G_2 + P_2 \cdot G_1 + P_2 \cdot P_1 \cdot C_P \text{ etc.}$$

If (SP) = "1", i.e. split, then $P^*_1 \cdot C_P = 0$; therefore;

$$C_1 = C_{IN}$$

$$C_2 = G^*_{10} + 0 = G_1 + P_1 \cdot C_{IN}$$

$$C_3 = G_2 + P_2 \cdot G^*_{10} + 0 = G_2 + P_2 G_1 + P_2 \cdot P_1 \cdot C_{IN}, \text{ etc.}$$

as we can see, $P^*_1$ performs two tasks; thus:
 1 if (SP) = "0", then $P_1$ propagates $C_P$
 2 if (SP) = "1", then $P_1$ splits the adder.
$G^*_1$ also performs two tasks; thus:
 1 if (SP) = "0", then $G^*_{10}$ is as conventional $G_1$
 2 if (SP) = "1", then $G^*_{10}$ acts to assimilate $C_{IN}$ into the adder and makes the $\overline{G^*_0}$ signal (discussed later) to act as $\overline{C_{OUT}}$.

The "Split" signal SP may also be used to split the ALU, as will be discussed more fully below particularly with respect to FIGS. 5 and 5a–5c.

Additional technical advantages of the foregoing arrangement, as compared to other known adders, are:

(a) extreme output loading within a group are reduced;

(b) extreme fan-in into "and" gates are reduced;

(c) extreme fan-in into "or" gates are reduced;

In addition, the $C_{OUT}$ output signal in conventional circuits is redundant. The $C_{OUT}$ signal may nevertheless be obtained since: if (SP) = "1", then $G^*_0 = C_{OUT}$, which leads to the possibility of connecting an additional least-significant group over a conventional 2-level CLA system (shown at position MO in FIG. 12, described below).

FIG. 1 illustrates a 4-bit "CLA" group.

The foregoing will be better understood by the specific implementations described below particularly with respect to FIGS. 9–11. However, at this point it may also be mentioned that the SP "split" signal potentially provides additional advantages, from the architectural standpoint, over and above the advantages discussed above. For example, the SP signal can also be used to split the ALU into separate units. This exploitation of the SP "split" signal will be better understood by reference to FIG. 5 and the accompanying FIGS. 5a–5c.

Thus, FIG. 5 diagramically illustrates a complete ALU having DATA-IN and SUM-OUT, and also $C_{IN}$, $C_{OUT}$, and OVR (overflow), for four groups of bits $N_1$–$N_4$. The four-group ALU of FIG. 5 is equivalent to the four separate groups $N_1$–$N_4$ illustrated in FIG. 5a, wherein it will be seen that each such group also has a $C_{IN}$, $C_{OUT}$ and OVR. The propagation delay is a function of the time of addition, but since the OVR demands extra propagation delay, then as a practical matter there is a minimum propagation delay of one additional time unit.

FIG. 5a, which is equivalent to FIG. 5, shows that if the ALU is broken down into groups (e.g., for temporary carry storage use or for operation as four separate ALU's), each group must have a $C_{IN}$ and OVR for independent ALU operation, and also an additional $C_{OUT}$ if operated as a temporary carry storage system.

FIG. 5b illustrates a known arrangement to enable the foregoing system to be operated either together as a single group as shown in FIG. 5, or as individual groups $N_1$–$N_4$ as shown in FIG. 5a. For such a capability, the system is equipped, between each group, with a logic unit receiving a "split" (SP) binary signal which, in one state, causes the ALU to operate as a single group as in FIG. 5, and in another state causes it to operate as individual groups as shown in FIG. 5a. In such known systems, however, the additional logic unit provided between each group introduces an additional propagation delay per addition.

FIG. 5c, however, illustrates how the "split" signal SP, in an ALU constructed in accordance with the present invention, permits the ALU to be operated either as one complete ALU, or as separate smaller ALU's, without any additional propagation delay. Not only does such a system, constructed in accordance with the invention, avoid the additional propagation delay, but it also improves the usual propagation delay in a normal ALU. Thus, as shown in FIG. 5c, the system includes an SP "split" signal, inputted with $C_{IN}$ into each group (actually into the $LLP_1$ logical level) which, in one binary state ("0") of SP, causes the system to operate as one complete ALU, and in the other binary state ("1"), causes the system to operate as four separate ALU's, e.g. for temporary carry storage purposes or for other purposes. This aspect of the invention will also be better understood by the description below of several specific implementations, particularly as shown in FIGS. 9–11.

A further feature of the present invention enables a substantial improvement to be made in the overall architecture of the ALU. This feature will be best understood by reference to FIG. 6 which illustrates an ALU array according to the prior art, and FIGS. 7 and 7a which illustrate ALU arrays according to the present invention, FIG. 7 illustrating a 3-level CLA and FIG. 7a illustrating a 2-level CLA.

Thus, as shown in FIG. 6, the construction of the prior art ALU arrays, is based on two kinds of integrated circuits, these being shown in FIG. 6 as the ALU device 74181, and the CLA device 74182. Unfortunately, these known devices are logically not best divided into integrated-circuit groups. Thus, the existing ALU devices, such as the 74181, include the LLP (preparation) logical level of the second-level CLA system, and exclude the LLC (combination) logical level of the same-level CLA system. The existing CLA devices, such as the 74182, include the LLC logical level (having three combined carry outputs $C_{N+X}$, $C_{N+Y}$, $C_{N+Z}$), of the second-level CLA system and the LLP logical level of the third-level CLA system (output $\overline{P}$ or X, $\overline{G}$ or Y). That is to say, generally speaking the existing CLA devices include the LLC (combination) logical levels of the N'th-level CLA system, and the LLP (preparation) logical levels of the (N+1)'th-level CLA system. Accordingly, when such devices as the 74181 and 74182 are wired together to form ALU arrays, long and circuitous wiring is required, as shown in FIG. 6.

The present invention, among its other advantages as discussed above, provides a better design, from a logic standpoint, for division into groups, thereby permitting a much simpler organization of an ALU array with substantially simpler and shorter wiring between the devices. Thus, the present invention permits both the LLP and LLC logical levels to be included in the same CLA device, e.g. in the same integrated circuit chip or chips, wherein the LLC logical level has only one combined carry output $C_P$ for the respective CLA level.

Such a new CLA design would also require the ALU device to be redesigned, either by excluding the LLP logical level of the second-level CLA system, or by including the LLC logical level of the second-level CLA system. However, such a redesign of the ALU device has also been suggested because of other in-group innovations; for example, the Fairchild 9340 is designed with both LLP$_2$ and LLC$_2$ logical levels of the second-level CLA system within the device.

According to this feature of the invention, the CLA device includes circuitry for implementing the following typical equations for the LLP and LLC logical levels:

For LLP $G_0 = G_{N-1} + P_{N-1} \cdot G_{N-2} + P_{N-1} \cdot P_{N-2} \cdot G_{N-3} + P_{N-1} \cdot P_{N-2} \cdot P_{N-3} \cdot C_{N-4}$ $P_0 = P_{N-1} \cdot P_{N-2} \cdot P_{N-3}$ For LLC $C_N = G_{0-1} + P_{0-1} \cdot G_{0-2} + P_{0-1} \cdot P_{0-2} \cdot G_{0-3} + P_{0-1} \cdot P_{0-2} \cdot P_{0-3} \cdot C_{0-4}$ This design would have the disadvantage of requiring a comparatively high number of pins (19) per device. However, it would have the extremely important advantage of permitting a much simpler organization of the ALU array, with substantially shorter and simpler wiring in between the devices. Further, one additional Head Group (i.e., the most signficant group, per most significant section), and one additional Head Section (i.e., the most significant section per most significant division), etc. may be connected without increasing extreme loads per output, and without increasing extreme inputs into "AND" and "OR" gates.

More particularly, both the LLP and LLC of the same second CLA level may be incorporated in one integrated circuit (IC) device or chip with either positive or negative logic inputs/outputs such as to permit a plurality of such IC chips to be connected together either alone to form a 2-level CLA system, or with additional IC chips to form a 3-level CLA system. Such a 2-level system is illustrated in FIG. 7a, wherein each ALU chip is identified as "Y"; and such a 3-level CLA system is illustrated in FIG. 7, wherein each ALU chip is also identified as "Y" and the additional CLA chip is identified as "Z". For example the "Y" chip in both FIGS. 7 and 7a may have a CLA circuit as illustrated in FIGS. 9–11, whereas the "Z" chip of FIG. 7 may have the circuit illustrated in FIG. 8.

Thus, each Y-chip may be constructed according to FIGS. 9, 10 or 11 (described more particularly below) to include, in one Y-chip, LLP circuitry having input logic of one sense and output logic of the opposite sense driving the LLC of the respective level and the LLP of the succeeding level. Assuming that the LLP input logic is "negative", and the output logic is "positive", the chip for the respective level would include LLC circuitry having positive input logic driven by the LLP circuitry of that level and the LLC circuitry of the succeeding level, and negative output logic driving the Sum Part of the respective group. Examples of circuitry that may be used for the Y-chip are illustrated in FIGS. 9–11, described more particularly below together with typical equations to be implemented by such circuitry as set forth in the tables appearing at the end of this application.

Such Y-chips can be connected together in the manner illustrated in FIG. 7a to form a 2-level CLA system, without any additional circuitry. However, by the addition of the Z-chip, illustrated in FIG. 8, such Y-chips can be connected together in the manner illustrated in FIG. 7 to produce a 3-level or higher-level CLA system.

Figure 8:
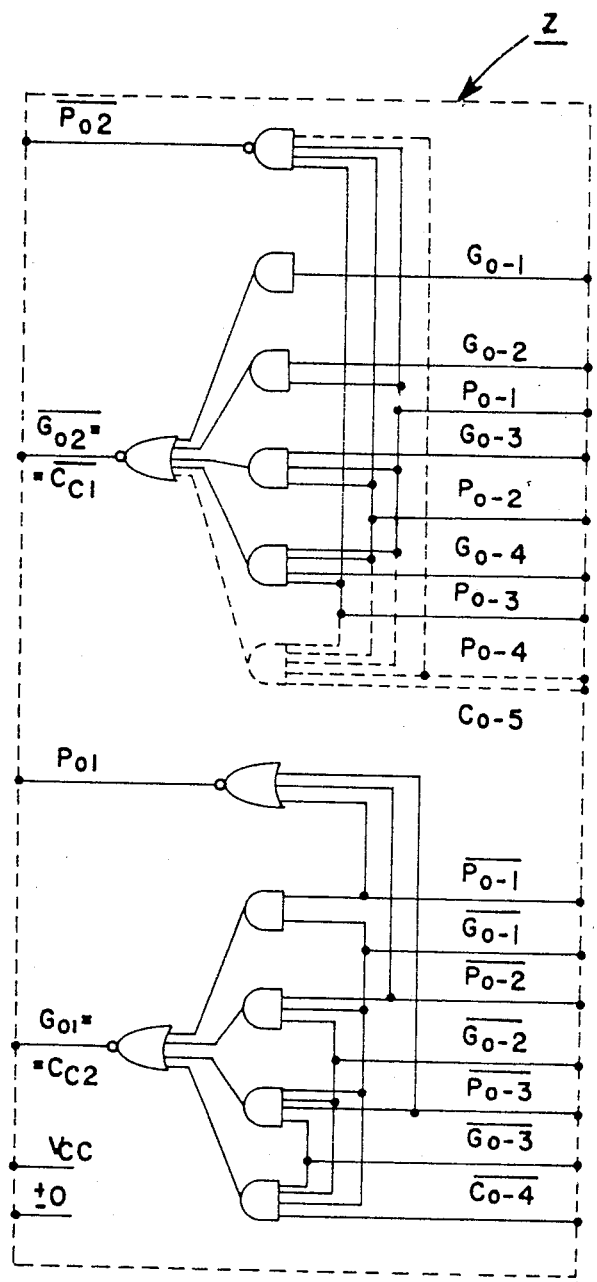
FIG. 8 is a diagram illustrating one circuit that may be used for the novel CLA component "Z" in FIG. 7.

As shown in FIG. 8, the Z-chip (of FIG. 7) includes first circuitry (i.e., the upper half of FIG. 8) having input logic of one sense (i.e., "positive"), and output logic of the opposite sense (i.e., "negative"); and second circuitry (i.e., the lower half of FIG. 8) of reverse-sense logic, i.e. negative input logic and positive output logic. Either circuitry can be used as the LLP or LLC for the third or higher-level CLA, depending on the logic of the previous CLA level. Thus, if the Y-chips include (as the case in FIGS. 9–11, to be described more particularly below) negative-to-positive logic in the LLP, and positive-to-negative logic in the LLC, then the upper circuitry in the Z-chip of FIG. 8 would be used as LLP, and the lower circuitry would be used as LLC. In such a case, the seven inputs in the upper (LLP) circuitry of FIG. 8 would be connected to the LLP output of the second-level CLA, and the two-outputs would serve as the LLP output for the third-level CLA; whereas the seven inputs in the lower (LLC) circuitry would be connected to the LLP of the third-level CLA, and one output would serve as the $C_P$ third-level CLA output. On the other hand, if the Z-chip of FIG. 8 is used with Y-chips in which the input and output logics are reversed, then the lower circuitry in FIG. 8 would be used as the LLP, and the upper circuitry in FIG. 8 would be used as the LLC.

Thus, whereas conventional CLA IC devices incorporate three LLC outputs and one pair of LLP outputs of the next CLA level, the Z-chip illustrated in FIG. 8 incorporates one pair of LLP outputs and one LLC output of the same CLA level, and is so designed to be useful with either positive or negative CLA logic. This permits a plurality of alternate reverse-logic CLA devices to be connected together to form a CLA system with minimum progagation delay, one inverter delay being saved for a two-level CLA system (FIG. 7a), and two inverter delays being saved with each additional CLA level (e.g. FIG. 7), when compared to existing devices such as the 74182.

The Z-device, which as noted above is used together with the Y-devices to provide a CLA system of more than 2 CLA levels, should implement the following typical logical equation:

PREFERRED IMPLEMENTATIONS OF THE INVENTION

FIGS. 9–13 illustrate a number of preferred implementations of the foregoing concepts of the present invention.

The FIG. 9 System

It will be seen that the implementation illustrated in FIG. 9 is patterned after the prior art CLA system illustrated in FIG. 1, except that it includes the above-described "split" feature of separating the carry-in signal ($C_{IN}$) inputted into the LLP, of the respective group, from the intermediate combined propagated carry signal ($C_P$) between groups, and introducing the $C_{IN}$ signal into the input of the $LLP_1$ logical level combined with the LSB signals and with the "split" signal (SP), the binary state of the latter signal determining whether the $C_{IN}$ is to be effective or not.

Thus, the FIG. 9 system, which may be incorporated in a single IC chip, includes only the circuitry defining a 4-bit CLA system, in which the logical circuitry shown at the upper portion (namely gates 4, 16 etc. outputting $P^*_1$, $G^*_{10}$, $P_2$, $G_2$, $P_3$, $G_3$ and $P_4$, $G_4$) define the LLP logical level, and the lower circuitry (namely gates 7, 8, 9, 10 outputting $\overline{C}_1$, $\overline{C}_2$, $\overline{C}_3$, $\overline{C}_4$) define the LLC logical level. The $C_{IN}$ signal is separated from the $C_P$ signal and is inputted, via gate 1 with the "split" signal SP, into gate 4, the latter constituting a "wide gate". The $C_{IN}$ signal is also applied, via lead 2, an inverter, and lead 6, into gate 7 of the LLC logical level, $$G_{01} = (C_{C2}) = \overline{\overline{G_{0-1}} \cdot \overline{P_{0-1}}} + \overline{\overline{G_{0-1}} \cdot \overline{G_{0-2}} \cdot \overline{P_{0-2}}} + \overline{\overline{G_{0-1}} \cdot \overline{G_{0-2}} \cdot \overline{G_{0-3}} \cdot \overline{P_{0-3}}} + \overline{\overline{G_{0-1}} \cdot \overline{G_{0-2}} \cdot \overline{G_{0-3}} \cdot \overline{G_{0-4}}}$$

$$P_{01} = \overline{\overline{P_{0-1}} + \overline{P_{0-2}} + \overline{P_{0-3}}}$$

$$\overline{G_{02}} = \overline{(C_{C1})} = \overline{G_{0-1} + P_{0-1} \cdot G_{0-2} + P_{0-1} \cdot P_{0-2} \cdot G_{0-3} + P_{0-1} \cdot P_{0-3} \cdot P_{0-3} \cdot G_{0-4}}$$

$$\overline{P_{02}} = \overline{P_{0-1} \cdot P_{0-2} \cdot P_{0-3}}$$

Such a Z-device would require 20 pins, would be useful for both sets of equations, and would provide the following advantages:

(a) no more than 6 loads per output (connected to 2 or 3 devices);
(b) no more than 4 inputs per "AND" gate;
(c) no more than 4 inputs per "OR" gate.

By adding $P_{0-4}$ and $G_{0-5}$ to $G_{02}$ and $P_{02}$ equations, we gain additional groups, sections, etc., while still keeping within the restriction of 6 loads per output; but in this case will be 5 inputs per "AND" gate, 5 inputs per "OR" gate, and 22 pins per device.

According to a still further feature of the present invention, the "Y" IC's including the LLP and LLC circuitry for 2 CLA levels may also include circuitry defining the Sum Part of the respective group, and further circuitry defining arithmetic-logic selectors and logic function selectors. This is more particularly described below with respect to the implementation illustrated in FIG. 10.

together with the $C_P$ signal from the succeeding LLC logical level via the logic circuitry including the wide gate 3. The $C_P$ signal is also outputted via lead 19 as the $C_{OUT}$ of the least significant groups of the ALU.

The propagated carry output $P^*_0$ and the generated carry output $G^*_0$ from the LLP logical level are applied, via logical circuitry 18 and 11, respectively, to the subsequent groups of the CLA system.

It will also be seen that the circuitry at the upper part of FIG. 9, defining the LLP logical level, is based on negative-to-positive logic, receiving negative inputs and producing positive outputs to the logic circuitry 7, 8, 9, and 10, defining the LLC logic of that respective CLA level, and also to the logic circuitry 11 and 18 defining the inputs to the next LLP logical level. It will also be seen that the LLC logical circuitry (elements 7–10) receives positive-logic inputs from the LLP circuitry of the respective CLA level, and also from the LLC circuitry 3 of the succeeding CLA level, and produces negative-logic outputs $\overline{C}_1$, $\overline{C}_2$, $\overline{C}_3$, $\overline{C}_4$.

Thus, the circuit illustrated in FIG. 9, which may be incorporated in a single IC as a part of the ALU to constitute a "Y" device (FIGS. 7, 7a) uses the pre-produced signals $P_2$, $P_3$, $P_4$, $G_2$, $G_3$, $G_4$, and the specific signals $P^*_1$ and $G^*_{10}$.

The $C_P$ signal is also used; it is a composition of several input signals according to the following equation:

$$C_P = \overline{\overline{G_{N-1}} \cdot \overline{P_{N-1}}} + \overline{\overline{G_{N-1}} \cdot \overline{G_{N-2}} \cdot \overline{P_{N-2}}} + \overline{\overline{G_{N-1}} \quad \overline{G_{N-2}} \quad \overline{G_{N-3}} \quad \overline{P_{N-3}}} + \overline{\overline{G_{N-1}} \quad \overline{G_{N-2}} \quad \overline{G_{N-3}} \quad \overline{G_{N-4}}}$$

The internal carry equations are as follows:

$C_1 = C_{IN} \cdot SP + \overline{SP} \cdot C_P$ $C_2 = G^*_{10} + P^*_1 \cdot C_P$ $C_3 = G_2 + P_2 \cdot G^*_1 + P_2 \cdot P^*_1 \cdot C_P$ $C_4 = G_3 + P_3 \cdot G_2 + P_3 \cdot P_2 \cdot G^*_{10} + P_3 \cdot P^*_2 \cdot P^*_1 \cdot C_P$ The generated carry output equation is as follows:

$\overline{G^*_0} = \overline{G_4 + P_4 \cdot G^*_3 \cdot P_4 \cdot P_3 \cdot G_2 + P_4 \cdot P_3 \cdot P_2 \cdot G^*_{10}}$ IF(SP) = "0", then $G^*_0 = G_0$
IF(SP) = "1", then $G^*_0 = C_5 = C_{OUT}$ The carry propagating output equation is as follows:

$\overline{P^*_0} = \overline{P_4 \cdot P_3 \cdot P^*_2 \cdot P^*_1}$

IF(SP) = "0", then $P^*_0 = P_0$, the CLA is not split and $P^*_0$ serves as conventional external CLA propagation.

IF(SP) = "1", then $P^*_0 = $ SPLIT, the CLA is split, and $P^*_0$ serves to disable external CLA propagation.

At gate 1 the signal $C_{IN} \cdot SP$ is combined into the inverted signal $\overline{C_{IN} \cdot SP}$ 2 after having been separated from signal $C_P$ 3. Signal 2 then drives gate 4 to product the $G^*_{10}$ signal 5, which equals;

$G^*_{10} = G_1 + P_1(C_{IN} \cdot SP) = A_1 \cdot B_1 + A_1 \cdot C_{IN} \cdot SP + B_1 \cdot C_{IN} \cdot SP$ Signal 2 is inverted-back to produce $(C_{IN} \cdot SP)$ 6 to drive gate 7 for producing $C_1$. The signal 5 drives gates 8, 9, 10 and 11, as in a conventional CLA function.

Figure 10:
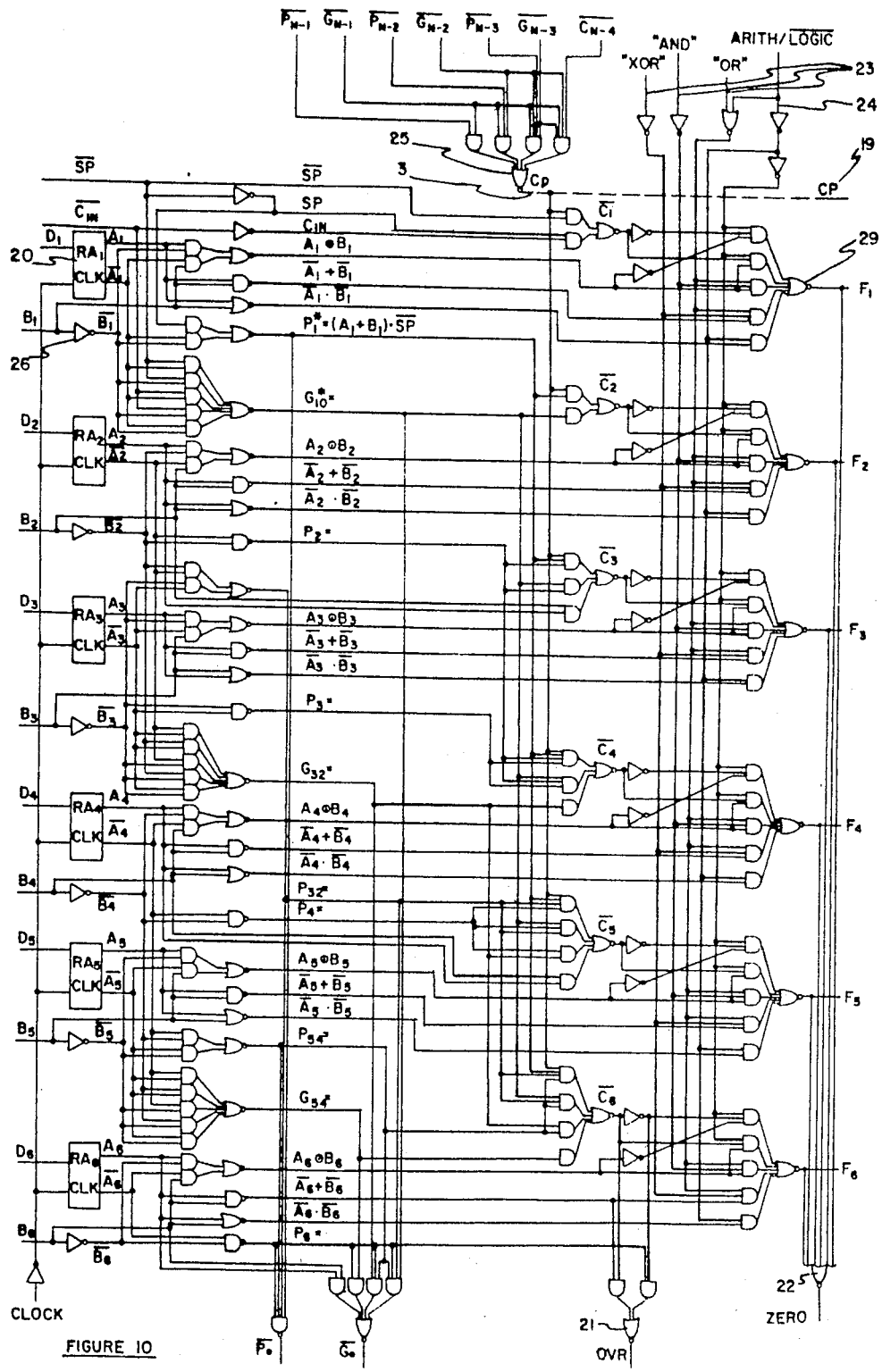
FIG. 10 is a diagram illustrating a complete 6-bit ALU, this constituting one "Y" component in FIGS. 7 and 7a constructed in accordance with the present invention.
Figures 10, 10A:
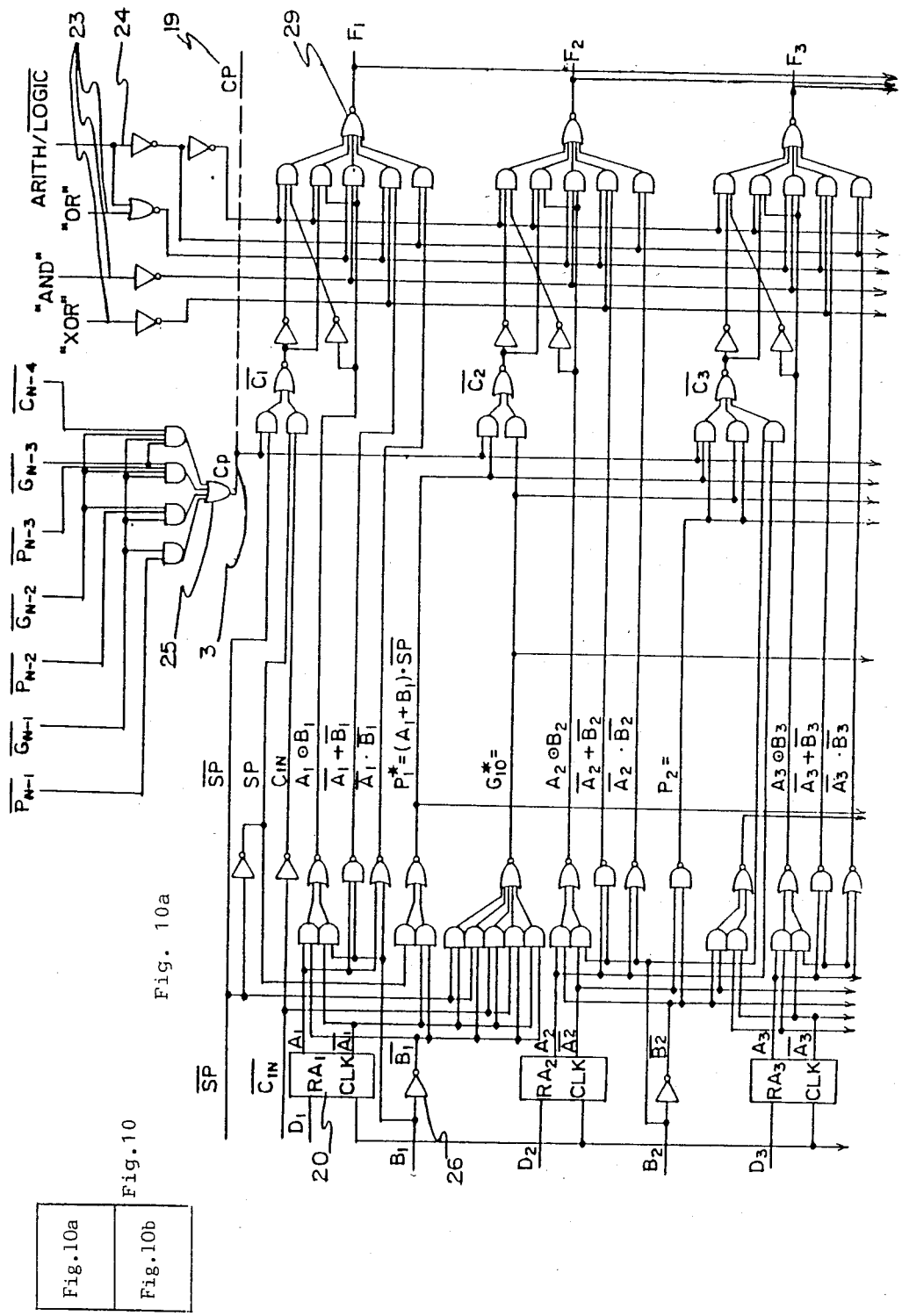
Figure 10B:
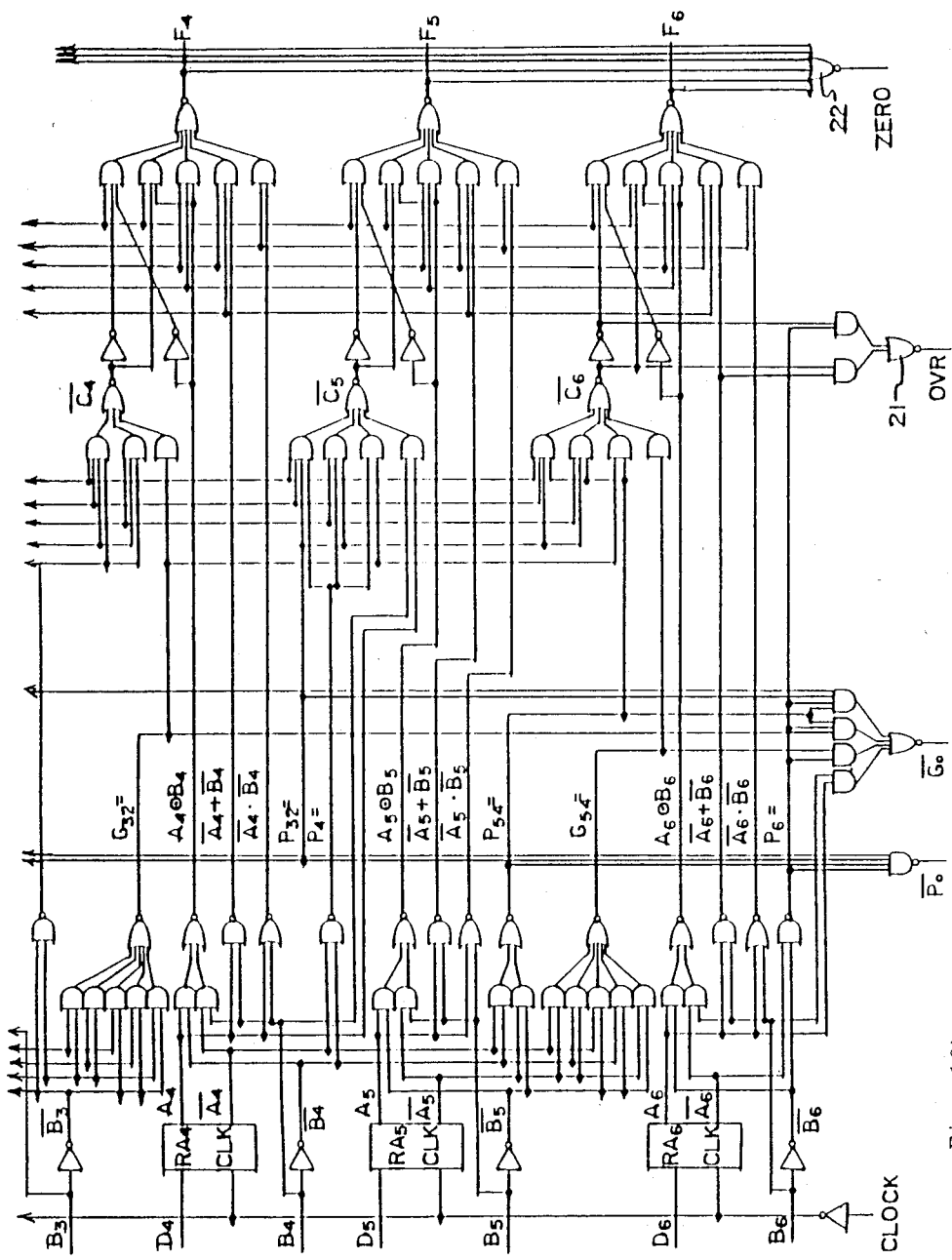

Although gate 1 is in series with gate 4, it does not effect practical delays since the $C_{IN}$ signal is earlier produced, (see FIG. 10, input B, 26).

FIG. 9a illustrates a modification providing an alternative signal $G_{10}^*$. Signals $C_{IN}$ (13) and $SP$(14) are directly combined via wide gate 12 to produce $G^*_{10} = \overline{A_1} \cdot \overline{B_1} + \overline{A_1} \cdot \overline{C_{IN}} + \overline{B_1} \cdot \overline{C_{IN}} + \overline{A_1} \cdot \overline{SP} + \overline{B_1} \cdot \overline{SP}$ The signal SP 15 drives gate 16 to produce $P^*_1$ 17, which drives gates 8, 9, 10 and 18 as in a conventional CLA function.

Gate 11 combines the generated carry output $\overline{G^*_0}$, and gate 18 combines the carry propagating output $\overline{P^*_0}$. The $C_P$ signal 3 is also outputted at 19 to constitute the $C_{OUT}$ of the least significant groups of its ALU. This signal $C_P$ may also be outputted through an inverter to form $\overline{C_P}$.

If several such groups as described above are connected together for assembling a multibit ALU (see FIGS. 12, 13), then such an ALU may be split into parts, e.g. by programming, by firmware, by option block wiring, or by fixed wiring the SP signal at a desired inter-group position to be logical "1".

Figure 9B:
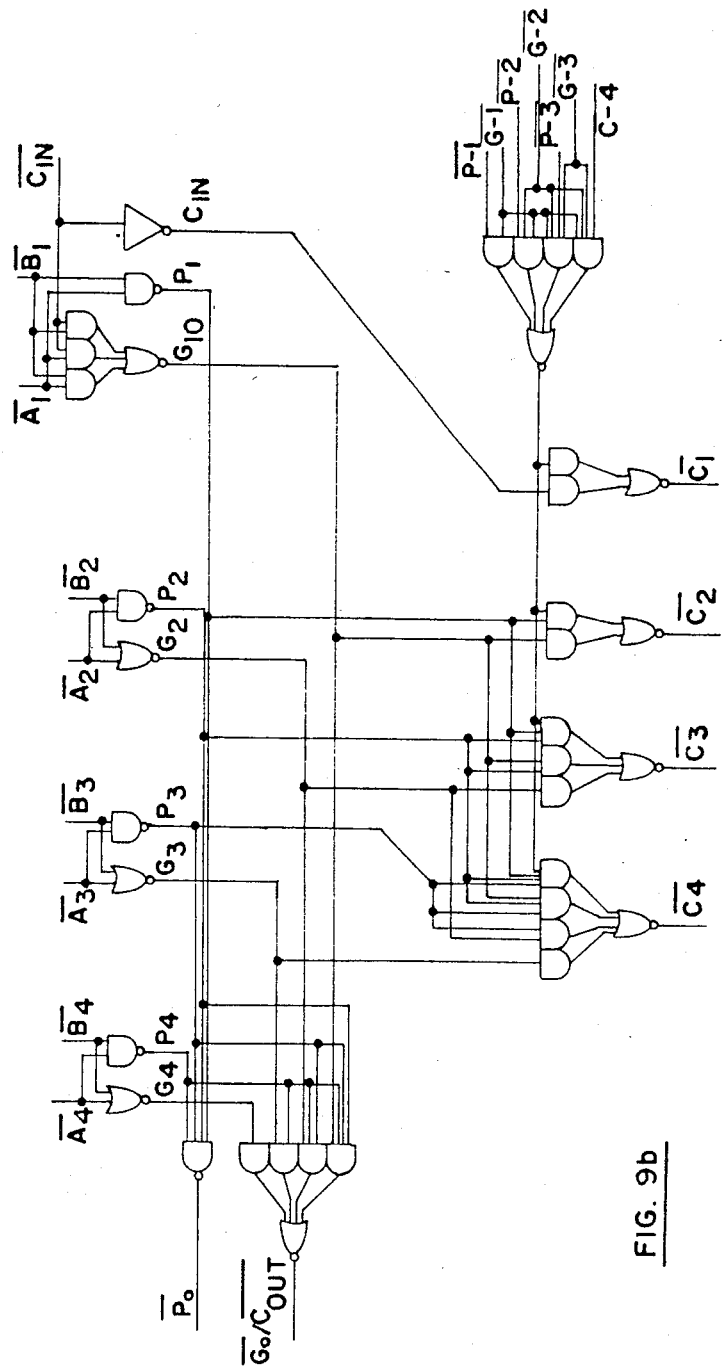

FIG. 9b illustrates a circuit similar to that of FIG. 9, except without the "split" signal SP, but otherwise including the same logical circuitry as described above with respect to FIG. 9.

See Table 4 appearing at the end of this specification, for a listing of the advantages available when using the implementation of both FIGS. 9 and 9b in an ALU constructed to include either a 3-level CLA as in FIG. 7 or a 2-level CLA as in FIG. 7a, as compared to the conventional ALU as in FIG. 6.

The FIG. 10 System

FIG. 10, with the set of equations appearing in Tables 2,5 at the end of this specification, illustrates an embodiment of a 6-bit ALU group.

This extended-length ALU group implements additional combined logic and includes complete basic ALU functions (see Note 2 at the end of the specification) as follows:

The functions included in the ALU are: *Logical functions:* "and", "or", "xor", "zero", "compare"; and *Arithmetic functions:* add, carry-in, overflow, zero, and $C_P$ output 19 (see Note 6).

The ALU logical components are as follows: An accumulator register RA 20, OVR 21 overflow output, zero 22 output, the logical functions "and", "or" and "xor" 23, formed in negative logic to reduce execution time of the logical functions, arith/$\overline{LOGIC}$ 24 "switchover" input, and the input gate 25 which forms the signal $C_P$ 3. This gate 25 enables a direct connection of up to five groups (Note 3), with negative logic equations at inter-group CLA level, without any additional external logic (see FIG. 11). The inter-group, negative logic, carry equations, are as follows:

$$C_{PN} = \overline{\overline{G^*_{N-1}} \cdot \overline{P^*_{N-1}}} + \overline{\overline{G^*_{N-1}} \quad \overline{G^*_{N-2}} \quad \overline{D^*_{N-2}}} + \overline{\overline{G^*_{N-1}} \quad \overline{G^*_{N-2}} \quad \overline{G^*_{N-3}} \quad \overline{D^*_{N-3}}} + \overline{\overline{G^*_{N-1}} \quad \overline{G^*_{N-2}} \quad \overline{G^*_{N-3}} \quad \overline{G^*_{N-4}}}$$

$$C_{PN-1} = \overline{\overline{G^*_{N-2}} \cdot \overline{P^*_{N-2}}} + \overline{\overline{G^*_{N-2}} \cdot \overline{G^*_{N-3}} \cdot \overline{P^*_{N-3}}} + \overline{\overline{G^*_{N-2}} \cdot \overline{G^*_{N-3}} \cdot \overline{G^*_{N-4}}}$$

$$C_{PN-2} = \overline{\overline{G^*_{N-3}} \cdot \overline{P^*_{N-3}}} + \overline{\overline{G^*_{N-3}} \cdot \overline{G^*_{N-4}}}$$

$$C_{PN-3} = \overline{\overline{G^*_{N-4}}}$$

Free P inputs have to be connected to $\pm 0\ V$

-continued
Free G inputs have to be connected to ± Vcc

If (SP)="1" then: $C_{IN}$ is the initial carry input, $\overline{G^*_0} = \overline{C_{OUT}} = \overline{C_7}$ and $\overline{P^*_0} =$ "0", disables exterial propagation of $C_P$ that arrives from less significant groups.

If (SP)="0" then: $C_P$ is the carry input, $\overline{G^*_0} = \overline{G_0} =$ generated carry and $\overline{P^*_0} = \overline{P_0} =$ carry propagating signal.

The target of 6-bits per group is achieved by specifically combining "pair signals into one". The signals which are combined in these specific illustrations are:

$$G_{32}=G_3+P_3 \cdot G_2; \ G_{54}=G_5+P_5 \cdot G_4; \ P_{32}=P_3 \cdot P_2;$$
$$P_{54}=P_5 \cdot P_4$$

(see equations of Table 5)

The functional advantage that has been achieved is maximum propagation delay (see Note 4) for 6 bit+-$C_{IN}+C_{OUT}+$OVR arithmetic operation—3 wide gates+inverter (see Note 5).

The technical improvements that have been achieved are:
maximum fan-in into "and" gate —4 inputs
maximum fan-in into "or" gate —5 inputs (6 inputs for zero signal; 4 inputs without "split" function, 4-bit groups Such a six-bits group may be integrated to form one IC chip or a part of an ALU array.

By assembling five such ALU group components (see Note 3 and FIG. 11) in two-level CLA systems with negative logic at inter-group connections, —a complete 30-bit ALU plus carry-in plus over-flow, is achieved.

The maximum propagation delay is 5 wide gates+inverter (Notes 4, 5, 7).

If an ALU is assembled in three levels with negative-logic at inter-group connections and positive-logic at intersection connections (see Note 3 and FIG. 12), then up to 138 bits may be assembled in the ALU with maximum propagation delay of 7 wide gates+inverter (Notes 4, 5, 7).

It is also possible to assemble up to 498 bit per ALU with maximum propagation delay of 9 wide gates+inverter (Notes 3, 4, 5, 7).

Obviously such a long ALU seems to be over-practical, but since such an ALU can be split by programming into multiple ALU subunits by the splitting method, then multi-simultaneously-operations and the concept of variable length multiplication, division and other mathematical functions, together with a selected desired accuracy, can easily be implemented and executed.

Although the ALU may be physically hardwired in a three or four level CLA system, if split by programming within a section, then propagation delay of an individual ALU does not exceed one section delay; and if split into individual groups, then the maximum propagation delay is as for a one group delay.

Figure 11:
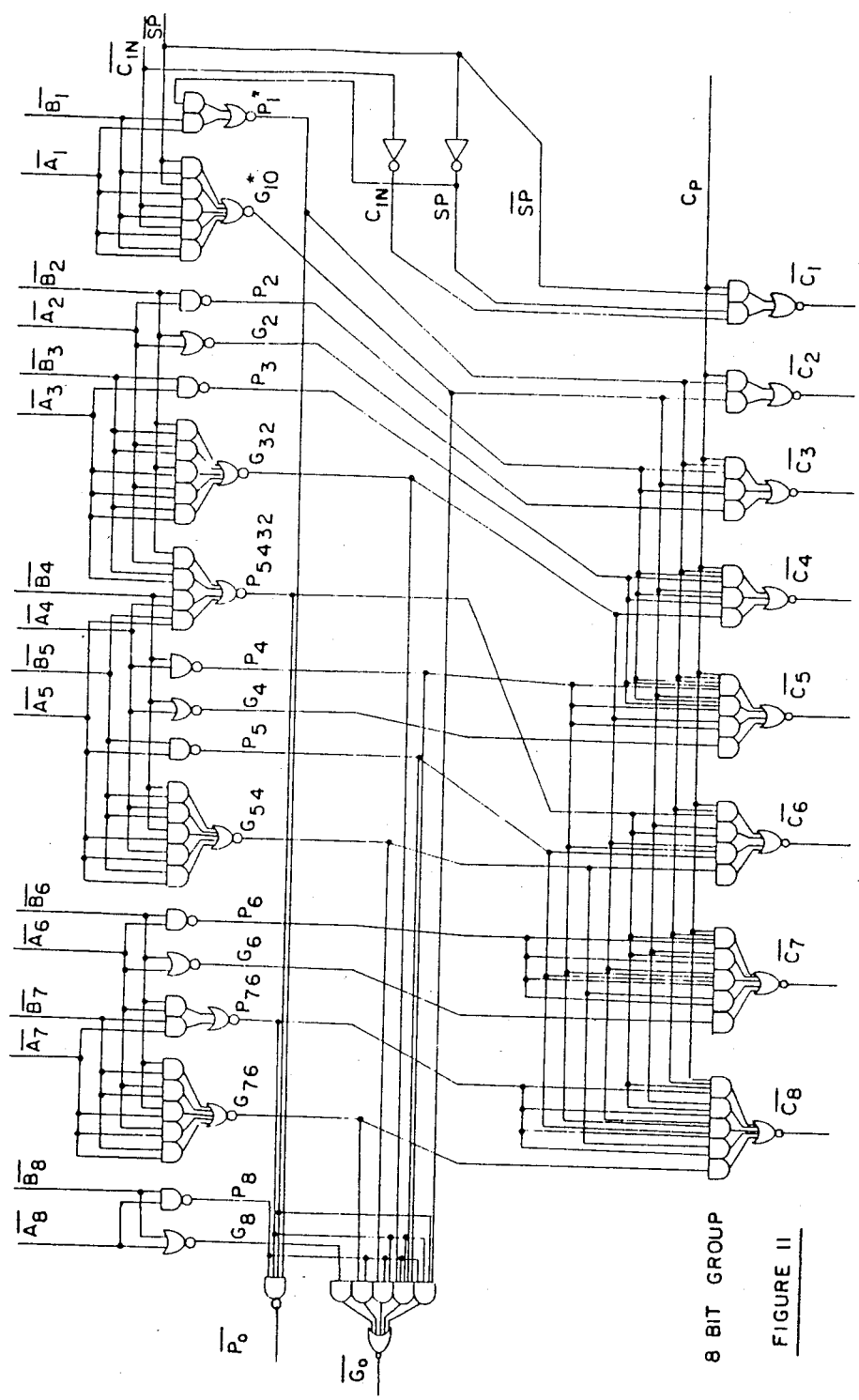
FIG. 11 is a diagram illustrating an 8-bit CLA system constructed in accordance with the invention.

The FIG. 11 System

FIG. 11, with the set of equations in Table 6 at the end of the specification illustrates an embodiment of an 8-bit CLA group within the restriction of eight loads per output. This compares very favorably with IBM's 5-bit group of Note 1 below wherein the fan-out exceeds 11 loads per output). This target is achieved by specifically combining "pair" and "quad" signals into "one" signal. The signals which are specifically combined in this specific illustration are, $G_{32}=G_3+P_3 \cdot P_2$,
$G_{54}=G_5+P_5 \cdot G_4$, $G_{76}=G_7+P_7 \cdot G_6$, $P_{76}=P_7 \cdot P_6$ and $P_{5432}=P_5 \cdot P_4 \cdot P_3 \cdot P_2$.

The main functional improvement that is achieved per 8-bit full adder $+C_{IN}+C_{out}$ is maximum propagation delay of 3 wide gates+inverter (Notes 4,5).

The technical improvements are:
Maximum fan-in into "and" gate is 5
Maximum fan-in into "or" gate is 5

The eight-bit group permits a 40-bit ALU in two levels with maximum propagation delay of 5 wide gates+inv, while intergroup loads are restricted (see Notes 3,4,7), or to a 184-bit ALU in three levels with maximum propagation delay of 7 wide gate+inv (Notes 3, 4, 7).

If output loads have to be restricted and not to exceed 4 loads per output, then by grouping 3 bits in a group:
in a two-level CLA 5 wide+inv. we gain 12 bits;
in three-level CLA 7 wide+inv. we gain 30 bits;
in four-level CLA 9 wide+inv. we gain 66 bits.

Additional technical improvements are:
Maximum fan-in into "and" gate 3;
Maximum fan-in into "or" gate 3:

By connecting $A_0$ to $C_{IN}$, $B_0$ to SP and $C_P$ inputs to +Vcc, then the eight-bits CLA system of FIG. 10 can be used to constitute a ten-bit adder where $G_0^*$ is the carry to the tenth bit, and without initial carry input. The maximum propagation delay is 3 wide gates+INV (see Note 4).

The following additional features apply to any group described herein:

The ALU may include four-levels, using an alternate positive-negative-logic technique, which would have less propagation delay than a 3-level CLA system with positive logic or negative logic at interconnections.

The ALU may also be split into 2 bits per group, and within the restriction of 4 loads per output, it is still possible to assemble 60 bits with 9 wide gate+inv. delay.

If 6 loads are permitted, then up to 166 bits may be assembled in 4 levels, or 46 bits in 3 levels.

Two bits per group with temporary carry storage fits multiplication processing wherein 2 bits are decoded per step.

The FIGS. 12 and 13 Systems

FIG. 12 illustrates how a standard printed circuit card may be designed to assemble components in different combinations. Let us first refer to the following groups as:

Groups $M_1$, $M_2$, $M_3$ together as a section;
Group $M_0$, the least significant group, as the tail group; and
Group $M_4$, the most significant group, as the head group.

The standard printed circuit card may be assembled either with:
(a) 5 groups—$M_0$, $M_1$, $M_2$, $M_3$, $M_4$—to become a two level array of a 30-bit ALU (if 6 bits per group); or
(b) higher CLA levels as:
(1) a section including $M_1$, $M_2$, $M_3$ assembled with additional appropriate input and output signals logic; or (2) as a tail-section including $M_0$, $M_1$, $M_2$, $M_3$, assembled with the additional appropriate output signals logic; or (3) as a head-section including $M_1$, $M_2$, $M_3$, $M_4$, assembled with the additional appropriate input signals logic.

It will thus be seen that the standard printed circuit card can be assembled with 5 groups ($M_0$, $M_1$, $M_2$, $M_3$, $M_4$) to form a 2-level CLA system without any additional logic circuitry, in which case all the "E" bridges would be disconnected. Alternately, the card may be assembled as a section including group $M_1$, $M_2$, $M_3$, with additional appropriate input gates, as shown on the right side of FIG. 12, and output gate $R_N$, $T_N$, and $T_{(N-1)}$. This latter combination is illustrated in FIG. 13, including printed circuit boards $PC_1$–$PC_5$. All "P" points have to be bridged, besides $E_8$, and the left side of $E_8$ has to be connected to $+V_{CC}$.

A further alternative is to connect the cards as a Tail Section including groups $M_0$, $M_1$, $M_2$ and $M_3$, with the additional appropriate output gates. In this case only $R_N$ is used, the latter also being used as $PC_0$ in FIG. 13; all "E" points have to be bridged besides $E_1$.

A further alternative is to connect the card as a Head Section including groups $M_1$, $M_2$, $M_3$, $M_4$, assembled with additional appropriate input gates, on the right side of FIG. 12. This arrangement is used as $PC_6$ in FIG. 13; only $E_1$ has to be bridged.

FIG. 13 illustrates an array of 5 sections plus one head-section, plus one tail-section, to make 23 groups in three levels, this being gained by combining specific signals, "three into one signal" 27 and "six into one signal" 28.

Maximum fan-in into "and" gate-4-inter-section level.

Maximum fan-in into "or" gate-6 at inter-section level.

While the invention has been described with respect to a number of preferred embodiments, it will be appreciated that these are illustrated for purposes of example only, and that many other variations, modifications and applications of the invention may be made.

Special Notes

1. Report "high speed arithmetic in binary circuits" published by O. L. MacSorley in Proc. of the IRE Jan. 1961.
2. This practical 6 bits ALU group circuit, was selected to show the withstanding in the restriction imposed (Note 3).
3. Restrictions were made not to exceed six loads per output.
4. If the output wide gates 29 are combined as a bit input to a register then Maximum propagation delay is reduced by one wide gate.
5. Maximum logical functions delay—2 wide gates (Note 4).
6. This signal $C_P$, demands additional output load. The use of this signal to produce a temporary carry storage (carry save) must be considered due to the fast addition.
7. Due to distances at inter-groups or inter sections connections additional delay must be taken into account.

TABLE 2

| FIG. 4a |
|---|
| $P_1^* = (A_1 + B_1) \cdot \overline{SP}$ |
| $P_2 = (A_2 + B_2)$ |
| $P_3 = (A_3 + B_3)$ |
| $P_{32} = (A_3 + B_3) \cdot (A_2 + B_2)$ |
| $P_4 = (A_4 + B_4)$ |
| $P_{54} = (A_5 + B_5) \cdot (A_4 + B_4)$ |
| $P_6 = (A_6 + B_6)$ |
| $G_{10}^* = A_1 \cdot B_1 + (A_1 + B_1) \cdot C_{IN} \cdot SP$ |
| $G_2 = A_2 \cdot B_2$ |
| $G_{32} = A_3 \cdot B_3 + (A_3 + B_3) \cdot A_2 \cdot B_2$ |
| $G_4 = A_4 \cdot B_4$ |
| $G_{54} = A_5 \cdot B_5 + (A_5 + B_5) \cdot A_4 \cdot B_4$ |
| $G_6 = A_6 \cdot B_6$ |

Note:
Without split, "SP", signal;
$[P_1^*] = P_1 = (A_1 + B_1)$,
$[G_{10}^*] = G_{10} = A_1 \cdot B_1 + (A_1 + B_1) \cdot C_{IN}$

TABLE 1

| FIG. 2 |
|---|
| $P_1 = A_1 + B_1$ |
| $P_2 = A_2 + B_2$ |
| $P_3 = A_3 + B_3$ |
| $P_4 = A_4 + B_4$ |
| $P_5 = A_5 + B_5$ |
| $P_6 = A_6 + B_6$ |
| $G_1 = A_1 \cdot B_1$ |
| $G_2 = A_2 \cdot B_2$ |
| $G_3 = A_3 \cdot B_3$ |
| $G_4 = A_4 \cdot B_4$ |
| $G_5 = A_5 \cdot B_5$ |
| $G_6 = A_6 \cdot B_6$ |

TABLE 3

| FIG. 4b |
|---|
| $P_1^* = (A_1 + B_1) \cdot \overline{SP}$ |
| $P_2 = (A_2 + B_2)$; or $P_{21}^* = (A_2 + B_2) \cdot (A_1 + B_1) \cdot \overline{SP}$ |
| $P_3 = (A_3 + B_3)$ |
| $P_{43} = (A_4 + B_4) \cdot (A_3 + B_3)$ |
| $P_{543} = (A_5 + B_5) \cdot (A_4 + B_4) \cdot (A_3 + B_3)$ |
| $P_6 = (A_6 + B_6)$ |
| $G_{10}^* = A_1 \cdot B_1 + (A_1 + B_1) \cdot C_{IN} \cdot SP$ |
| $G_{210}^* = A_2 \cdot B_2 + (A_2 + B_2) \cdot A_1 \cdot B_1 + (A_2 + B_2) \cdot (A_1 + B_1) \cdot C_{IN} \cdot SP = A_2 \cdot B_2 + P_2 \cdot A_1 \cdot B_1 + P_2 \cdot P_1 \cdot C_{IN} \cdot SP$ |
| $G_3 = A_3 \cdot B_3$ |
| $G_{43} = A_4 \cdot B_4 + (A_4 + B_4) \cdot A_3 \cdot B_3$ |
| $G_{543} = A_5 \cdot B_5 + (A_5 + B_5) \cdot A_4 \cdot B_4 + (A_5 + B_5) \cdot (A_4 + B_4) \cdot A_3 \cdot B_3 = A_5 \cdot B_5 + P_5 \cdot A_4 \cdot B_4 + P_5 \cdot P_4 \cdot A_3 \cdot B_3$ |
| $G_6 = A_6 \cdot B_6$ |

Note:
Without split, "SP", signal;
$[P_1^*] = P_1 = (A_1 + B_1)$;
$[P_{21}^*] = P_{21} = (A_2 + B_2) \cdot (A_1 + B_1)$;
$[G_{10}^*] = G_{10} = A_1 \cdot B_1 + (A_1 + B_1) \cdot C_{IN}$;
$[G_{210}^*] = G_{210} = A_2 \cdot B_2 + (A_2 + B_2) \cdot A_1 \cdot B_1 + (A_2 + B_2) \cdot (A_1 + B_1) \cdot C_{IN}$

TABLE 4

| | COMPARISON OF ADVANTAGES VS. FIG. 6, 7a, 7. | | | | | | | | |
|---|---|---|---|---|---|---|---|---|---|
| | FIG. 6 (CONVENTIONAL) | | FIG. 7a (2 level cla) | | | | FIG. 7 (3 level cla) | | |
| BIT/ALU(B/A) | $16 < B/A \leq 64$ | $64 < B/A \leq 128$ | 20 | 30 | 40 | 48 | 68 | 102 | 120 | 138 |
| BITS/GROUP | 4 | 4 | 4 | 6 | 8 | 8 | 4 | | 6 | |
| CLA LEVELS | 3 | 4 | 2 | | | | | 3 | | |
| CLA DEVICES | 5 | 7 | 0 | | | | 4"z" | 5"z" | 6"z"' | + EXTRA |

TABLE 4-continued

COMPARISON OF ADVANTAGES VS. FIG. 6, 7a, 7.

| | FIG. 6 (CONVENTIONAL) | FIG. 7a (2 level cla) | | | FIG. 7 (3 level cla) | |
|---|---|---|---|---|---|---|
| | | | | | LOGIC, TWO 6 INPUTS "NOR" GATES SEE FIG. 12 (28). | |
| PROPAGATION DELAY WITHOUT SPLIT | 6 WIDE + 3 INV. + 1 NOR + 1 NAND | 8 WIDE + 5 INV. + 1 NOR + 1 NAND | 5 WIDE + INV. | | 7 WIDE + INV. | |
| PROPAGATION DELAY WITH SPLIT SIGNAL | 7 WIDE + 4 INV. + 1 NOR + 1 NAND | 9 WIDE + 6 INV. + 1 NOR + 1 NAND | 5 WIDE + INV.* | | 7 WIDE + INV.* | |
| EXTREME OUTPUTS LOADING | 8 | 8 | 6   6(7) | 8(9)   9 | 6 | 6(7) |
| EXTREME INPUTS INTO "AND" GATES | 4 | 4 | 4 | 5 | 4 | |
| EXTREME INPUTS INTO "OR" GATES | 4 | 4 | 4* | 5 | 4* | 5 |
| | CLA WIRINGS ARE COMPARATIVELY LONG | | CLA WIRINGS ARE COMPARATIVELY SHORT | | | |

*IF SP SIGNAL IS INCLUDED THEN INPUTS INTO "OR" GATE = 5 AND P.D. IS ONE INV. OR INPUTS INTO "OR" GATE = 4 AND P.D. IS TWO INV.

TABLE 5

(6 bit alu equation set of FIG. 10)

$$\overline{C_1} = \overline{C_{IN} \cdot SP + \overline{SP} \cdot CP}$$

$$\overline{C_2} = \overline{G_{10}^* + P_1^* \cdot CP}$$

$$\overline{C_3} = \overline{A_2 \cdot B_2 + P_2 \cdot G_{10}^* + P_2 \cdot \overline{P_1^* \cdot CP}} \quad \text{(SEE NOTE B)}$$

$$\overline{C_4} = \overline{G_{32} + P_3 \cdot P_2 \cdot G_{10}^* + P_3 \cdot P_2 \cdot P_1^* \cdot CP} \quad \text{(SEE NOTE A)}$$

$$\overline{C_5} = \overline{A_4 \cdot B_4 + P_4 \cdot G_{32} + P_4 \cdot P_{32} \cdot G_{10}^* + P_4 \cdot P_{32} \cdot P_1^* \cdot CP} \quad \text{(SEE NOTE B)}$$

$$\overline{C_6} = \overline{G_{54} + P_{54} \cdot G_{32} + P_{54} \cdot P_{32} \cdot G_{10}^* + P_{54} \cdot P_{32} \cdot P_1^* \cdot CP}$$

$$\overline{C_o} = \overline{A_6 \cdot B_6 + P_6 \cdot G_{54} + P_6 \cdot P_{54} \cdot G_{32} + P_6 \cdot P_{54} \cdot P_{32} \cdot G_{10}^*} \quad \text{(SEE NOTE B)}$$

$$\overline{P_o} = \overline{P_6 \cdot P_{54} \cdot P_{32} \cdot P_1^*}$$

$$F_1 = \text{LOGIC} \cdot \overline{\overline{A_1} \cdot \overline{B_1}} + \overline{\text{LOGIC}} \cdot \text{"OR"} \cdot (\overline{A_1} + \overline{B_1}) \cdot \overline{\text{"XOR"}} + \overline{A_1 \oplus B_1} \cdot \overline{\text{"AND"}} + \text{ARITH} \cdot \overline{A_1 \oplus B_1 \cdot \overline{C_1}} + (A_1 \oplus B_1) \cdot C_1$$

$$F_2 = \text{LOGIC} \cdot \overline{\overline{A_2} \cdot \overline{B_2}} + \overline{\text{LOGIC}} \cdot \text{"OR"} \cdot (\overline{A_2} + \overline{B_2}) \cdot \overline{\text{"XOR"}} + \overline{A_2 \oplus B_2} \cdot \overline{\text{"AND"}} + \text{ARITH} \cdot \overline{A_2 \oplus B_2 \cdot \overline{C_2}} + (A_2 \oplus B_2) \cdot C_2$$

$$F_3 = \text{LOGIC} \cdot \overline{\overline{A_3} \cdot \overline{B_3}} + \overline{\text{LOGIC}} \cdot \text{"OR"} \cdot (\overline{A_3} + \overline{B_3}) \cdot \overline{\text{"XOR"}} + \overline{A_3 \oplus B_3} \cdot \overline{\text{"AND"}} + \text{ARITH} \cdot \overline{A_3 \oplus B_3 \cdot \overline{C_3}} + (A_3 \oplus B_3) \cdot C_3$$

$$F_4 = \text{LOGIC} \cdot \overline{\overline{A_4} \cdot \overline{B_4}} + \overline{\text{LOGIC}} \cdot \text{"OR"} \cdot (\overline{A_4} + \overline{B_4}) \cdot \overline{\text{"XOR"}} + \overline{A_4 \oplus B_4} \cdot \overline{\text{"AND"}} + \text{ARITH} \cdot \overline{A_4 \oplus B_4 \cdot \overline{C_4}} + (A_4 \oplus B_4) \cdot C_4$$

$$F_5 = \text{LOGIC} \cdot \overline{\overline{A_5} \cdot \overline{B_5}} + \overline{\text{LOGIC}} \cdot \text{"OR"} \cdot (\overline{A_5} + \overline{B_5}) \cdot \overline{\text{"XOR"}} + \overline{A_5 \oplus B_5} \cdot \overline{\text{"AND"}} +$$

TABLE 5-continued
(6 bit alu equation set of FIG. 10)

$$\text{ARITH} \cdot \overline{A_5 \oplus B_5} \cdot \overline{C_5} + (A_5 \oplus B_5) \cdot C_5$$

$$F_6 = \overline{\text{LOGIC} \cdot \overline{A_6 \cdot B_6} + \overline{\text{LOGIC}} \cdot \text{"OR"} \cdot (\overline{A_6} + \overline{B_6}) \cdot \text{"XOR"} + \overline{A_6 \oplus B_6} \cdot \text{"AND"} +$$

$$\text{ARITH} \cdot \overline{A_6 \oplus B_6} \cdot \overline{C_6} + (A_6 \oplus B_6) \cdot C_6$$

$$\text{OVR} = \overline{(\overline{A_6} + \overline{B_6}) \cdot \overline{C_6} + (A_6 + B_6) \cdot C_6}$$

$$\text{ZERO} = \overline{F_1 + F_2 + F_3 + F_4 + F_5 + F_6}$$

NOTE A: $P_3 \cdot P_2$ MAY BE COMBINED TO BE $P_{32}$
NOTE B: $A_2 \cdot B_2$, $A_4 \cdot B_4$ AND $A_6 \cdot B_6$ MAY RESPECTIVELY BE REPLACED BY $G_2$, $G_4$ AND $G_6$.

TABLE 6
(8 BIT CLA EQUATION SET FIG. 11)

$$G^*_{10} = \overline{\overline{A_1} \cdot \overline{B_1} + \overline{A_1} \cdot \overline{C_{IN}} + \overline{A_1} \cdot \overline{SP} + \overline{B_1} \cdot \overline{C_{IN}} + \overline{B_1} \cdot \overline{SP}} = A_1 \cdot B_1 + (A_1 + B_1) \cdot C_{IN} \cdot SP = G_1 + P_1 \cdot C_{IN} \cdot SP$$

$$G_{32} = \overline{\overline{A_3} \cdot \overline{B_3} + \overline{A_3} \cdot \overline{A_2} + \overline{A_3} \cdot \overline{B_2} + \overline{B_3} \cdot \overline{A_2} + \overline{B_3} \cdot \overline{B_2}} = A_3 \cdot B_3 + (A_3 + B_3) \cdot A_2 \cdot B_2 = G_3 + P_3 \cdot G_2$$

$$G_{54} = \overline{\overline{A_5} \cdot \overline{B_5} + \overline{A_5} \cdot \overline{A_4} + \overline{A_5} \cdot \overline{B_4} + \overline{B_5} \cdot \overline{A_4} + \overline{B_5} \cdot \overline{B_4}} = A_5 \cdot B_5 + (A_5 + B_5) \cdot A_4 \cdot B_4 = G_5 + P_5 \cdot G_4$$

$$G_{76} = \overline{\overline{A_7} \cdot \overline{B_7} + \overline{A_7} \cdot \overline{A_6} + \overline{A_7} \cdot \overline{B_6} + \overline{B_7} \cdot \overline{A_6} + \overline{B_7} \cdot \overline{B_6}} = A_7 \cdot B_7 + (A_7 + B_7) \cdot A_6 \cdot B_6 = G_7 + P_7 \cdot G_6$$

$$P^*_1 = \overline{\overline{A_1} \cdot \overline{B_1} + SP} = (A_1 + B_1) \cdot \overline{SP} = P_1 \cdot \overline{SP}$$

$$P_{5432} = \overline{\overline{A_5} \cdot \overline{B_5} + \overline{A_4} \cdot \overline{B_4} + \overline{A_3} \cdot \overline{B_3} + \overline{A_2} \cdot \overline{B_2}} = (A_5 + B_5) \cdot (A_4 + B_4) \cdot (A_3 + B_3) \cdot (A_2 + B_2) = P_5 \cdot P_4 \cdot P_3 \cdot P_2$$

$$P_{76} = \overline{\overline{A_7} \cdot \overline{B_7} + \overline{A_6} \cdot \overline{B_6}} = (A_7 + B_7) \cdot (A_6 + B_6) = P_7 \cdot P_6$$

$$\overline{C_1} = \overline{C_{IN} \cdot SP + \overline{SP} \cdot CP}$$

$$\overline{C_2} = \overline{G^*_{10} + P^*_1 \cdot CP}$$

$$\overline{C_3} = \overline{G_2 + P_2 \cdot G^*_{10} + P_2 \cdot P^*_1 \cdot CP}$$

$$\overline{C_4} = \overline{G_{32} + P_3 \cdot P_2 \cdot G^*_{10} + P_3 \cdot P_2 \cdot P^*_1 \cdot CP} \quad \text{(SEE NOTE A)}$$

$$\overline{C_5} = \overline{G_4 + P_4 \cdot G_{32} + P_4 \cdot P_3 \cdot P_2 \cdot G^*_{10} + P_4 \cdot P_3 \cdot P_2 \cdot P^*_1 \cdot CP} \quad \text{(SEE NOTE A)}$$

$$\overline{C_6} = \overline{G_{54} + P_5 \cdot P_4 \cdot G_{32} + P_{5432} \cdot G^*_{10} + P_{5432} \cdot P^*_1 \cdot CP} \quad \text{(SEE NOTE B)}$$

$$\overline{C_7} = \overline{G_6 + P_6 \cdot G_{54} + P_6 \cdot P_5 \cdot P_4 \cdot G_{32} + P_6 \cdot P_{5432} \cdot G^*_{10} + P_6 \cdot P_{5432} \cdot P^*_1 \cdot CP} \quad \text{(SEE NOTE B)}$$

$$\overline{C_8} = \overline{G_{76} + P_{76} \cdot G_{54} + P_{76} \cdot P_5 \cdot P_4 \cdot G_{32} + P_{76} \cdot P_{5432} \cdot G^*_{10} + P_{76} \cdot P_{5432} \cdot P^*_1 \cdot CP} \quad \text{(SEE NOTE B)}$$

$$\overline{C_6} = \overline{G_8 + P_8 \cdot G_{76} + P_8 \cdot P_{76} \cdot G_{54} + P_8 \cdot P_{76} \cdot P_5 \cdot P_4 \cdot G_{32} + P_8 \cdot P_{76} \cdot P_{5432} \cdot G^*_{10}} \quad \text{(SEE NOTE B)}$$

$$\overline{P_0} = \overline{P_8 \cdot P_{76} \cdot P_{5432} \cdot P^*_1}$$

NOTE A: $P_3, P_2$ MAY BE COMBINED TO BE $P_{32}$
NOTE B: $P_5, P_4$ MAY BE COMBINED TO BE $P_{54}$

What is claimed is:

1. An arithmetic-logic-unit (ALU) comprising a plurality of bits arranged according to at least groups and sections including a carry-look-ahead (CLA) system having a plurality of CLA levels, each CLA level including logical preparation (LLP) circuitry in which are produced the intermediate combined signals, the generated carries ($G_N$) and the propagated carries ($P_N$) of the respective bit position ($A_N$, $B_N$), ($P_o$, $G_o$) for the respective group or section position and the logical combination (LLC) circuitry in which are produced the final combined propagated carry signals ($C_N$) for the first CLA level, or the intermediate combined propagated carry signals ($C_P$) for the other CLA levels; said LLP circuitry of the first CLA level interconnecting several bit positions so as to output from said first-level LLP circuitry the intermediate combination signals which are a function of a plurality of bit positions, rather than of a single bit position, thus expanding the number of bits per group while drastically reducing extreme fan-out loading expanding the number of groups per section, and maintaining the overflow signal propagation delay in-phase with the entire adder.

2. An ALU according to claim 1, further including means for separating the carry-in signal ($C_{IN}$) introduced into the least significant-bit (LSB) position of the respective group from the intermediate combined propagated carry signal ($C_P$) between groups, and for introducing same into the input of said first-level LLP circuitry combined with the LSB signals, whereas the $C_P$ signal is introduced into the LLC circuitry input of the respective CLA level.

3. An ALU according to claim 2, further including means for introducing, with said $C_{IN}$ signal introduced into the input of said first-level LLP circuitry, a binary split signal (SP) whose state determines whether the $C_{IN}$ signal is to be effective or not.

4. An ALU according to claim 3, wherein the mentioned signals have the following relationships:

$$P_1^* = \overline{\overline{A_1 \cdot B_1} + SP}$$

$$G_{1,0}^* = \overline{\overline{A_1 \cdot B_1} + \overline{A_1 \cdot C_{IN}} + \overline{B_1 \cdot C_{IN}} + \overline{A_1 \cdot SP} + \overline{B_1 \cdot SP}}$$

$$P_{3,2} = \overline{\overline{A_3 \cdot B_3} + \overline{A_2 \cdot B_2}}$$

$$G_{3,2} = \overline{\overline{A_3 \cdot B_3} + \overline{A_3 \cdot A_2} + \overline{B_3 \cdot A_2} + \overline{A_3 \cdot B_2} + \overline{B_3 \cdot B_2}}$$

$$P_{5,4} = \overline{\overline{A_5 \cdot B_5} + \overline{A_4 \cdot B_4}}$$

$$G_{5,4} = \overline{\overline{A_5 \cdot B_5} + \overline{A_5 \cdot A_4} + \overline{B_5 \cdot A_4} + \overline{A_5 \cdot B_4} + \overline{B_5 \cdot B_4}}$$

$$P_{5,2} = P_{5,4,3,2} = \overline{\overline{A_5 \cdot B_5} + \overline{A_4 \cdot B_4} + \overline{A_3 \cdot B_3} + \overline{A_2 \cdot B_2}}$$

for SP="1", said group is the least significant group of a splitted adder, for SP="0" said adder is not splitted.

5. An arithmetic logic unit (ALU) including a plural-level carry-look-ahead (CLA) system having logical preparation (LLP) circuitry in which are produced intermediate combined signals, the generated carries ($G_N$), and the propagated carries ($P_N$) of the respective position ($A_N$ $B_N$), and logical combination (LLC) circuitry in which are produced the propagated combined carry signals for the respective CLA level; said ALU including means for separating the carry-in signal ($C_{IN}$) into the least significant-bit (LSB) of the respective group, from the intermediate combined propagated carry signal ($C_P$) between groups, and for introducing same into the input of the first-level LLP circuitry combined with the LSB signals, whereas the $C_P$ signal is introduced into the LLC circuitry input of the respective CLA level.

6. An ALU according to claim 5, wherein it further includes means for introducing, with said $C_{IN}$ signal introduced into the input of said first-level LLP circuitry, a binary split signal (SP) whose state determines whether the $C_{IN}$ signal is to be effective or not.

7. An ALU according to claim 6, wherein for SP="1" the signal expressions $G^*_{1,0}$ and $P_1^*$ are as follows:

$$G_{1,0}^* = C_2 = \overline{\overline{A_1 \cdot B_1} + \overline{A_1 \cdot C_{IN}} + \overline{B_1 \cdot C_{IN}}} \text{ and}$$

$$P_1^* = \text{"0"},$$

the presence of the $C_{IN}$ signal meaning that the adder is capable of executing 2's complement arithmetical operations.

8. An ALU according to claim 5, wherein with an optional split signal "SP", if SP="1", the signal expressions $G^*_{1,0}$ and $P_1^*$ are as follows:

$$G_{1,0}^* = C_2 = \overline{\overline{A_1 \cdot B_1} + \overline{A_1 \cdot C_{IN}} + \overline{B_1 \cdot C_{IN}}} \text{ and}$$

$$P_1^* = \text{"0"}.$$

9. An ALU according to claim 5, wherein with an optional split signal "SP", if SP="0", the signal expressions $G^*_{1,0}$ and $P_1^*$ are as follows:

$$G_{1,0}^* = G_1 = \overline{\overline{A_1} + \overline{B_1}} \text{ and}$$

$$P_1^* = P_1 = \overline{A_1 \cdot B_1}.$$

10. An arithmetic logic unit (ALU) including a 2's complement adder/subtractor having a plurality of bits arranged according to a plurality of at least groups and sections and including
    levels of sum parts and carry-look-ahead (CLA) parts, each CLA level including logical preparation (LLP) circuitry in which are produced intermediate combined signals, the generated carries ($G_N$), and the propagated carries ($P_N$) of the respective bit position ($A_N$, $B_N$), ($P_o$, $G_o$) for the respective group or section position, and the logical combination (LLC) circuitry in which are produced the propagated combined carry signals $C_N$ for the first CLA level, or the intermediate combined propagated carry signals ($C_P$) for the other CLA levels; said ALU incorporating split means (SP) for splitting said adder-subtractor between said groups and sections so as to form therefrom at least two independent same-sense 2's compliment adders/subtractors, thus enabling, on the one hand, simultaneous multiple parallel processing of data having variable data length, and on the other hand, selecting the degree of accuracy desired.

11. An ALU according to claim 10, wherein for SP="1" the signal expressions $G^*_{1,0}$ and $P_1^*$ are as follows:

$$G_{1,0}^* = C_2 = \overline{\overline{A_1 \cdot B_1} + \overline{A_1 \cdot C_{IN}} + \overline{B_1 \cdot C_{IN}}} \text{ and}$$

-continued $$P_1^* = \text{"0"}.$$

12. An ALU according to claim 10, wherein for SP="0" the signal expressions $G^*_{1,0}$ amd $P_1^*$ are as follows:

$$G^*_{1,0} = G_1 = \overline{\overline{A_1} + \overline{B_1}} \text{ and}$$

$$P_1^* = P_1 = \overline{\overline{A_1} \cdot \overline{B_1}},$$

13. An arithmetic logic unit (ALU) including a plural-level parallel carry system having logical preparation (LLP) circuitry in which are produced intermediate combined signals, the generated carries ($G_N$) and the propagated carries ($P_N$) of the respective position ($A_N$, $B_N$); and logical combination (LLC) circuitry in which are produced the propagated combined carry signals for the respective carry level; said ALU including input means for introducing the carry-in ($C_{IN}$) signal into the immediate first-level LLP circuitry combined with the least-significant-bit LSB signals "$A_1$, $B_1$" and an optional split signal (SP), the mentioned signals having the following relationships:

$$C_1^* = \overline{\overline{C_{IN}} + \overline{SP}}$$

$$G^*_{10} = \overline{\overline{A_1} \cdot \overline{B_1} + \overline{A_1} \cdot \overline{C_{IN}} + \overline{B_1} \cdot \overline{C_{IN}} + \overline{A_1} \cdot \overline{SP} + \overline{B_1} \cdot \overline{SP}}$$

$$G^*_{210} = \overline{\overline{A_2} \cdot \overline{B_2} + (\overline{A_2} + \overline{B_2}) \cdot \overline{A_1} \cdot \overline{B_1} + (\overline{A_2} + \overline{B_2}) \cdot (\overline{A_1} + \overline{B_1}) \cdot (\overline{C_{IN}} + \overline{SP})}$$

For $SP = \text{"1"}$ $$C_1^* = C_1 = C_{IN}$$

$$G^*_{10} = C_2 = A_1 \cdot B_1 + A_1 \cdot C_{IN} + B_1 \cdot C_{IN}$$

$$G^*_{210} = C_3 = A_2 \cdot B_2 + (A_2 + B_2) \cdot A_1 \cdot B_1 + (A_2 + B_2)(A_1 + B_1) \cdot C_{IN}.$$

* * * * *